(12) United States Patent
Tischler et al.

(10) Patent No.: US 11,722,090 B2
(45) Date of Patent: Aug. 8, 2023

(54) CONTROL CIRCUITS FOR COMPRESSOR MOTORS INCLUDING MULTIPLE CAPACITORS

(71) Applicant: EMERSON ELECTRIC CO., St. Louis, MO (US)

(72) Inventors: Joshua Edward Tischler, St. Charles, MO (US); Charles Green, Fenton, MO (US)

(73) Assignee: EMERSON ELECTRIC CO., St. Louis, MO (US)

( * ) Notice: Subject to any disclaimer, the term of this patent is extended or adjusted under 35 U.S.C. 154(b) by 0 days.

(21) Appl. No.: 17/568,255

(22) Filed: Jan. 4, 2022

(65) Prior Publication Data

US 2022/0345068 A1 Oct. 27, 2022

Related U.S. Application Data

(60) Provisional application No. 63/177,630, filed on Apr. 21, 2021, provisional application No. 63/177,634, filed on Apr. 21, 2021.

(51) Int. Cl.
*H02P 25/04* (2006.01)
*H02P 29/024* (2016.01)
*F25B 31/02* (2006.01)

(52) U.S. Cl.
CPC .......... *H02P 29/027* (2013.01); *F25B 31/026* (2013.01); *H02P 25/04* (2013.01)

(58) Field of Classification Search
CPC ....... H02P 25/04; H02P 29/027; F25B 31/026
See application file for complete search history.

(56) References Cited

U.S. PATENT DOCUMENTS

| 2,762,004 A | 9/1956 | Shepardson |
| 3,504,863 A | 4/1970 | Burkland et al. |
| (Continued) | | |

FOREIGN PATENT DOCUMENTS

| EP | 1742348 B1 | 3/2011 |
| GB | 716089 A | 9/1954 |
| (Continued) | | |

OTHER PUBLICATIONS

InspectAPedia: Electric Motor Start/Run Capacitator Operation, http://inspectapedia.com/electric/Start_Capacitor_Operation.php; 2021; 14 pages.

(Continued)

*Primary Examiner* — Thai T Dinh
(74) *Attorney, Agent, or Firm* — Harness, Dickey & Pierce, P.L.C.

(57) ABSTRACT

A compressor assembly includes a compressor motor having a main winding coupled with a line terminal to receive power from a line voltage source, and an auxiliary winding. The assembly includes first and second capacitors each coupled between the line terminal and the auxiliary winding, a first relay to selectively couple the first capacitor and the second capacitor in parallel, a second relay coupled to selectively inhibit the supply of power from the line voltage source to the auxiliary winding via the first capacitor, and a control circuit configured to close the first relay in response detection of excess load condition criteria, and to subsequently open the first relay in response to detection of normal load condition criteria. The excess load condition criteria and the normal load condition criteria each include at least one of a voltage of the main winding and a voltage of the auxiliary winding.

28 Claims, 14 Drawing Sheets

(56) References Cited

U.S. PATENT DOCUMENTS

| | | | |
|---|---|---|---|
| 3,529,223 | A | 9/1970 | Vergez, Jr. |
| 3,545,684 | A | 12/1970 | Hilmanowski |
| 3,562,587 | A * | 2/1971 | Forst .................. H02K 11/25 |
| | | | 318/473 |
| 4,387,329 | A | 6/1983 | Harlow |
| 4,492,911 | A | 1/1985 | Molitor |
| 4,659,975 | A | 4/1987 | Vincent |
| 4,780,658 | A | 10/1988 | Koyama |
| 5,187,419 | A | 2/1993 | DeLange |
| 5,247,237 | A | 9/1993 | Koyama et al. |
| 5,276,392 | A | 1/1994 | Beckerman |
| 5,528,120 | A * | 6/1996 | Brodetsky .............. H02P 1/445 |
| | | | 318/785 |
| 5,808,441 | A * | 9/1998 | Nehring .................. H02H 7/08 |
| | | | 361/33 |
| 6,122,154 | A * | 9/2000 | Damerow ............ H01H 61/002 |
| | | | 361/105 |
| 6,194,864 | B1 | 2/2001 | Kinpara et al. |
| 6,407,530 | B1 * | 6/2002 | Kwon .................... H02P 1/445 |
| | | | 318/788 |
| 6,594,592 | B1 | 7/2003 | Griepentrog et al. |
| 7,071,650 | B2 * | 7/2006 | Ilda ........................ H02K 21/46 |
| | | | 327/365 |
| 7,365,959 | B1 | 4/2008 | Ward |
| 7,448,563 | B2 | 11/2008 | Berger et al. |
| 7,498,763 | B2 * | 3/2009 | Weigel .................. H02P 1/445 |
| | | | 318/788 |
| 7,538,507 | B2 | 5/2009 | Lu et al. |
| 7,583,127 | B2 | 9/2009 | Sibrai et al. |
| 7,679,307 | B2 | 3/2010 | Mills, Jr. et al. |
| 7,768,227 | B2 | 8/2010 | Vaez-Zadeh et al. |
| 7,971,810 | B2 | 7/2011 | Hirsch et al. |
| 8,120,305 | B2 | 2/2012 | Kim |
| 8,270,143 | B2 | 9/2012 | Stockman |
| 8,371,824 | B2 | 2/2013 | Jeong et al. |
| 8,456,795 | B2 | 6/2013 | Stockman |
| 8,618,761 | B2 | 12/2013 | Hudson et al. |
| 8,764,409 | B2 | 7/2014 | Han et al. |
| 9,222,246 | B2 | 12/2015 | VanAssche et al. |
| 9,422,698 | B2 | 8/2016 | Gormley et al. |
| 9,506,231 | B2 | 11/2016 | Gormley et al. |
| 9,806,660 | B1 | 10/2017 | Chretien et al. |
| 9,815,064 | B2 | 11/2017 | Hirsch et al. |
| 9,869,077 | B2 | 1/2018 | Gormley et al. |
| 10,471,438 | B2 | 11/2019 | Chavez |
| 10,804,830 | B1 | 10/2020 | Zhang et al. |
| 2006/0119308 | A1 * | 6/2006 | Weigel .................. H02P 1/445 |
| | | | 318/778 |
| 2007/0057647 | A1 * | 3/2007 | Burkhart ................ H02P 1/445 |
| | | | 318/786 |
| 2009/0213523 | A1 | 8/2009 | Slaughter |
| 2015/0115076 | A1 | 4/2015 | Gormley et al. |
| 2016/0197566 | A1 | 7/2016 | Alvey et al. |
| 2017/0085204 | A1 | 3/2017 | Didat |
| 2020/0171507 | A1 | 6/2020 | Berger et al. |

FOREIGN PATENT DOCUMENTS

| | | |
|---|---|---|
| GB | 745978 A | 3/1956 |
| IN | 258054 | 11/2013 |

OTHER PUBLICATIONS

Induction Motors, Trade of Electrician, Standards Based Apprenticeship Course Notes, Phase 2, Module No. 2.4, Unit No. 2.4.1., Revision Nov. 4, 2013, 48 pages.

What is Speed Control Induction Motor? By Linquip Team, circuitglobe.com, Jan. 26, 2021, 7 pages.

Determining Electric Motor Load and Efficiency, Motor Challenge Fact Sheet, U.S. Department of Energy, accessed Apr. 8, 2022, www.motor.doe.gov, 6 pages.

* cited by examiner

CONTROL CIRCUITS FOR COMPRESSOR MOTORS INCLUDING MULTIPLE CAPACITORS

CROSS-REFERENCE TO RELATED APPLICATIONS

This application claims the benefit and priority of U.S. Provisional Application No. 63/177,630, filed on Apr. 21, 2021, and U.S. Provisional Application No. 63/177,634, filed on Apr. 21, 2021. The entire disclosures of each of the above applications are incorporated herein by reference.

FIELD

The present disclosure relates to control circuits for compressor motors including multiple capacitors.

BACKGROUND

This section provides background information related to the present disclosure which is not necessarily prior art.

Refrigeration and air conditioning systems generally include a compressor, a condenser, an expansion valve, and an evaporator. A variety of compressor types have been used to implement refrigeration systems, including reciprocating compressors, screw compressors, rotary compressors, etc.

Single phase permanent split-capacitor (PSC) motor designs may balance between cost, operating efficiency, motor strength, and motor starting torque, in order to fulfill application requirements. "Hard Start Kits" may be utilized to help with startup of a motor, and typically include a start capacitor and a relay. Start capacitors are not rated for continuous duty and may fail if exposed to locked-rotor amps for an extended period of time (such as if the relay locks in the 'closed' position). Hard start kits only assist with starting torque. In some cases, drive solutions may be used to optimize a phase angle offset between windings of a single phase motor. Separately, multiple capacitors may be combined in a single, integral unit.

SUMMARY

This section provides a general summary of the disclosure, and is not a comprehensive disclosure of its full scope or all of its features.

According to one aspect of the present disclosure, a compressor assembly includes a compressor motor coupled to operate a compressor of a heating, ventilation and/or air-conditioning (HVAC) system. The compressor motor includes a stator core having a stator yoke and a plurality of teeth extending from the stator yoke toward a central opening. The central opening extends from a first end of the stator core to a second end of the stator core opposite the first end. The plurality of teeth are spaced apart from one another and define a plurality of slots between the plurality of teeth. The compressor motor further includes a main winding and an auxiliary winding located within the plurality of slots and wrapped around the plurality of teeth. The main winding is coupled with a line terminal to receive power from a line voltage source. The assembly includes a first capacitor coupled between the line terminal and the auxiliary winding to supply power to the auxiliary winding from the line voltage source, a second capacitor coupled between the line terminal and the auxiliary winding to supply power to the auxiliary winding from the line voltage source, a first relay coupled between the first capacitor and the second capacitor to selectively couple the first capacitor and the second capacitor in parallel, a second relay coupled between the first capacitor and the auxiliary winding to selectively inhibit the supply of power from the line voltage source to the auxiliary winding via the first capacitor, and a control circuit coupled to control switching operation of the first relay and the second relay. The control circuit is configured to close the first relay in response to detection of excess load condition criteria, and to subsequently open the first relay in response to detection of normal load condition criteria, the excess load condition criteria and the normal load condition criteria each including at least one of a voltage of the main winding and a voltage of the auxiliary winding.

According to another aspect of the present disclosure, a compressor assembly includes a compressor motor coupled to operate a compressor of a heating, ventilation and/or air-conditioning (HVAC) system. The compressor motor includes a stator core having a stator yoke and a plurality of teeth extending from the stator yoke toward a central opening. The central opening extends from a first end of the stator core to a second end of the stator core opposite the first end. The plurality of teeth are spaced apart from one another and define a plurality of slots between the plurality of teeth. The compressor motor further includes a main winding and an auxiliary winding located within the plurality of slots and wrapped around the plurality of teeth. The main winding is coupled to a line terminal to receive power from a line voltage source. The assembly includes a first capacitor coupled between the line terminal and the auxiliary winding to supply power to the auxiliary winding from the line voltage source, a second capacitor coupled between the line terminal and the auxiliary winding to supply power to the auxiliary winding from the line voltage source, a relay coupled between the first capacitor and the line terminal or the auxiliary winding to selectively inhibit the supply of power from the line voltage source to the auxiliary winding via the first capacitor, and a control circuit coupled to control switching operation of the relay. The control circuit is configured to receive at least one of a voltage of the main winding and a voltage of the auxiliary winding, close the relay during an initial startup time period of the compressor motor, subsequently open the relay in response to detection of startup condition criteria, and close the relay in response to detection of excess load condition criteria. The excess load condition criteria includes at least one of the received voltages of the main winding and the auxiliary winding.

According to another aspect of the present disclosure, a method of controlling a compressor motor assembly is disclosed. The assembly includes a compressor motor having a stator yoke and a plurality of teeth extending from the stator yoke toward a central opening. The central opening extends from a first end of the stator core to a second end of the stator core opposite the first end, and the plurality of teeth are spaced apart from one another and define a plurality of slots between the plurality of teeth. The compressor motor further includes a main winding and an auxiliary winding located within the plurality of slots and wrapped around the plurality of teeth. The main winding is coupled to a line terminal to receive power from a line voltage source. The assembly further includes a first capacitor coupled between a line terminal and the auxiliary winding, a second capacitor coupled between the line terminal and the auxiliary winding, a first relay coupled between the first capacitor and the second capacitor, and a second relay coupled between the first capacitor and the auxiliary winding. The method includes opening the first relay and closing the second relay during a run time period of the compressor motor, and receiving a voltage of at least one of the main winding and the auxiliary winding. In response to detection of excess load condition criteria including at least the received voltage, the method includes opening the second relay to disconnect the first capacitor from the line terminal or the auxiliary winding, closing the first relay after a specified voltage balance time period to couple the first capacitor and the second capacitor in parallel, and closing the second relay to connect the first capacitor and the second capacitor to the line terminal or the auxiliary winding, to supply power from the line terminal to the auxiliary winding via the first capacitor and the second capacitor.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
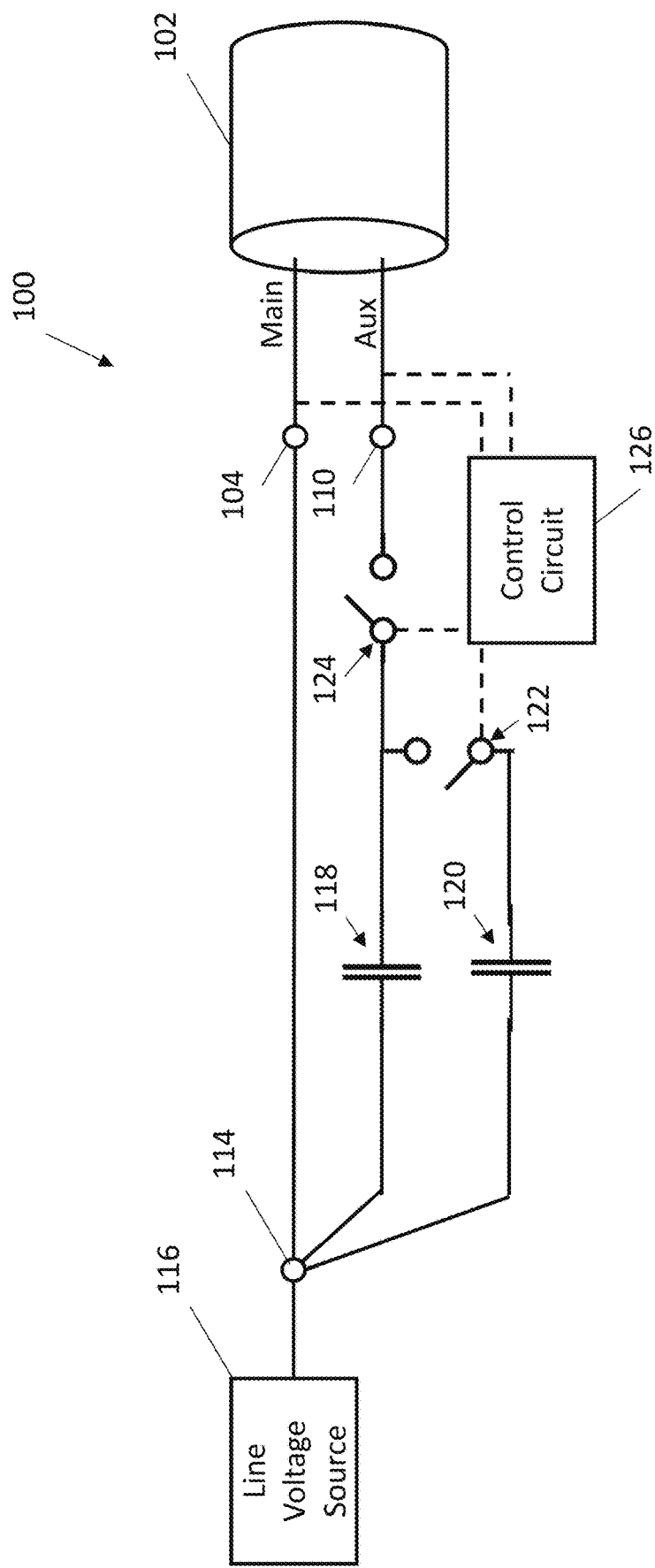
FIG. 1 is a block diagram of a compressor assembly, according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
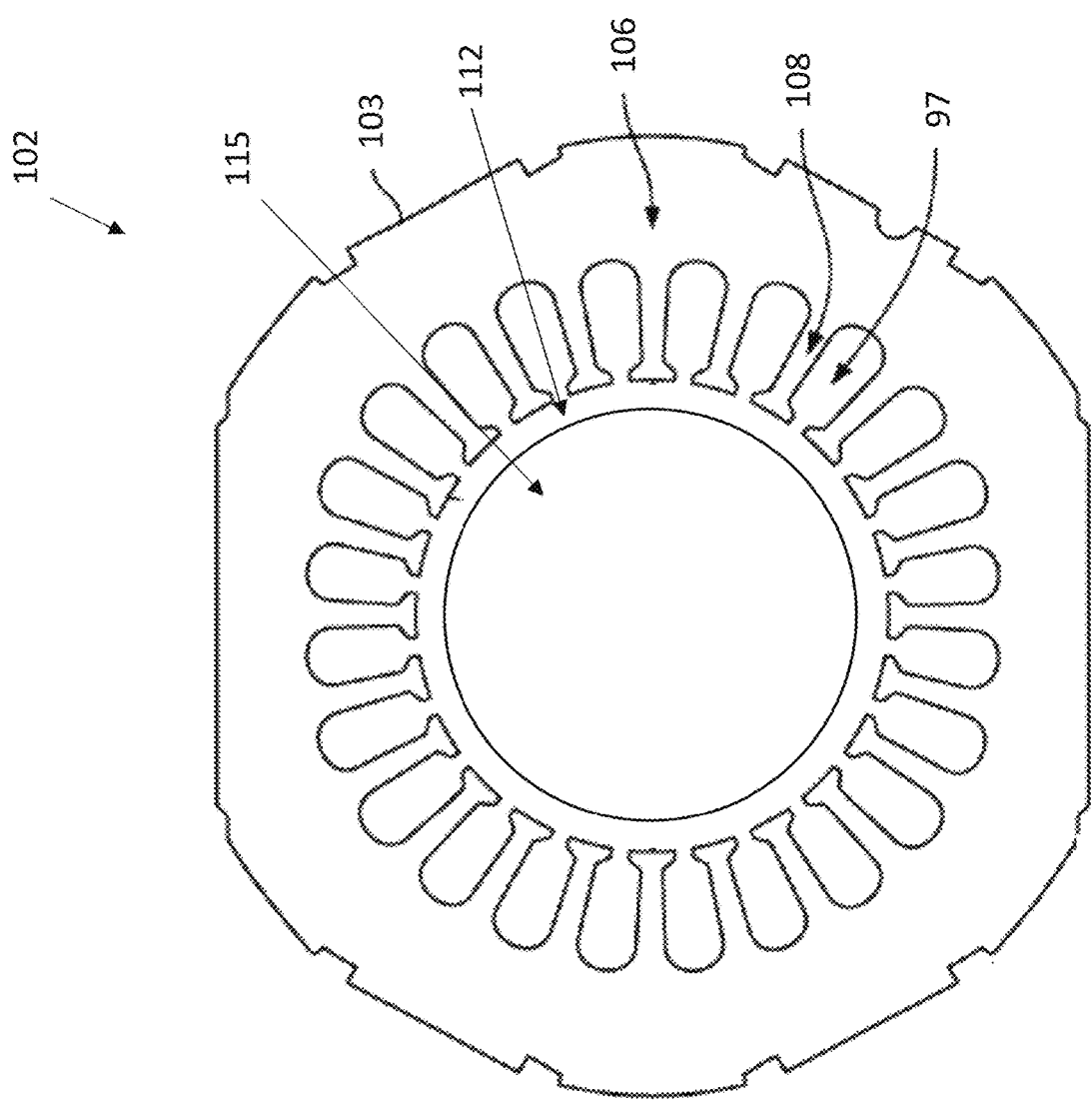
FIG. 2 is a top view of the compressor motor of FIG. 1.
Figure 3:
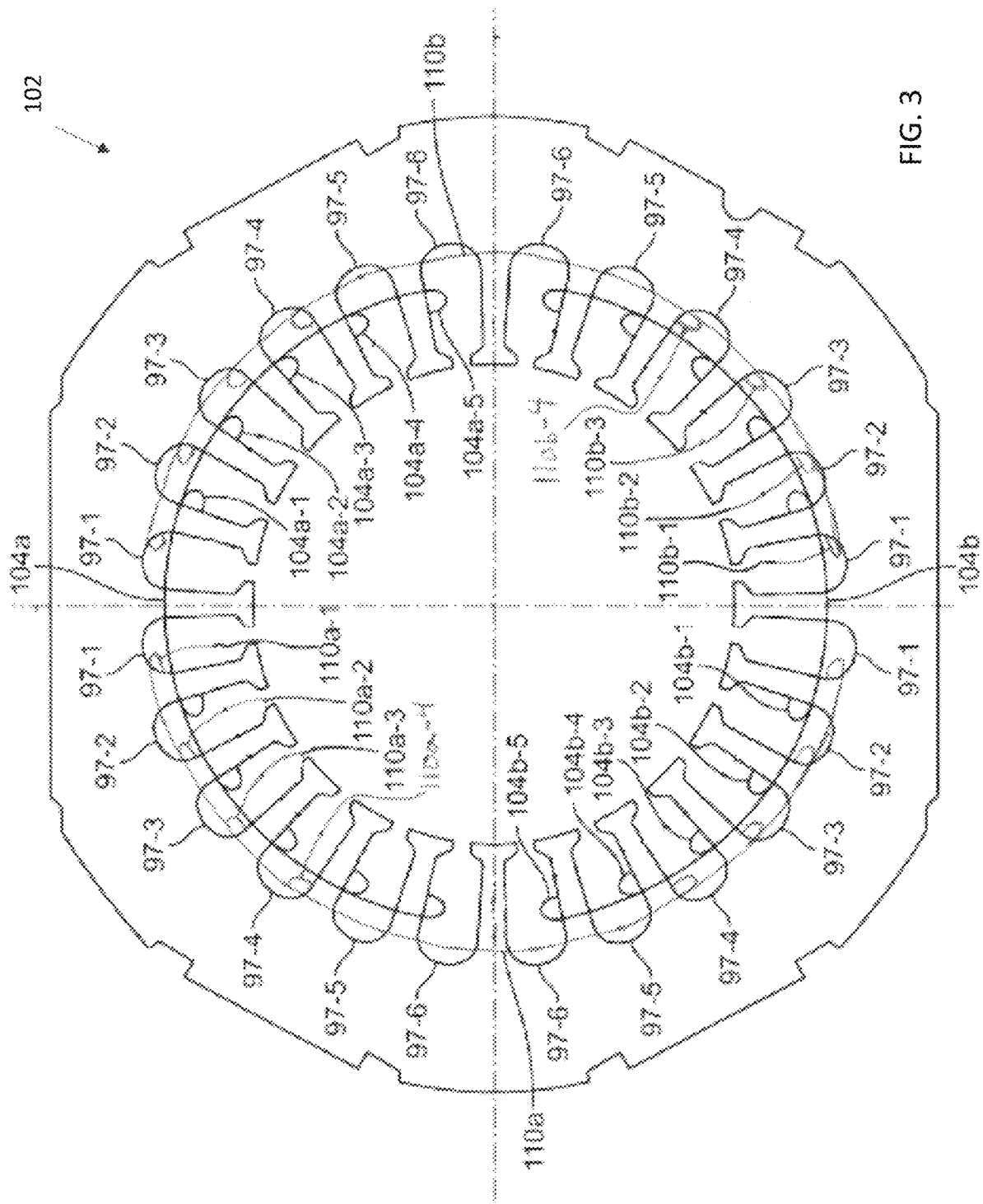
FIG. 3 is a top view of the compressor motor of FIG. 1, illustrating an example winding pattern of the compressor motor.

A compressor assembly according to one example embodiment of the present disclosure is illustrated in FIGS. 1-3, and indicated generally by the reference number 100. The compressor assembly 100 includes a compressor motor 102 coupled to operate a compressor of a heating, ventilation and/or air-conditioning (HVAC) system.

The compressor motor 102 includes a stator core 103 having a stator yoke 106 and a plurality of teeth 108 extending from the stator yoke 106 toward a central opening 112. The central opening 112 extends from a first end of the stator core 103 to a second end of the stator core 103 opposite the first end. The plurality of teeth 108 are spaced apart from one another and define a plurality of slots 97 between the plurality of teeth 108.

The compressor motor 102 further includes a main winding 104 and an auxiliary winding 110 located within the plurality of slots 97 and wrapped around the plurality of teeth 108. The main winding 104 is coupled with a line terminal 114 to receive power from a line voltage source 116 (such as a utility power supply). In other embodiments, the motor 102 may include more than one main winding 104, more than one auxiliary winding 110, etc.

As shown in FIG. 1, the assembly 100 includes a capacitor 118 coupled between the line terminal 114 and the auxiliary winding 110 to supply power to the auxiliary winding 110 from the line voltage source 116. A capacitor 120 is coupled between the line terminal 114 and the auxiliary winding 110 to supply power to the auxiliary winding 110 from the line voltage source 116.

The assembly 100 includes a relay 122 coupled between the capacitor 118 and the capacitor 120 to selectively couple the capacitor 118 and the capacitor 120 in parallel. A relay 124 is coupled between the capacitor 118 and the auxiliary winding 110 to selectively inhibit the supply of power from the line voltage source 116 to the auxiliary winding 110 via the capacitor 118.

In other embodiments, the relays 122 and/or 124 may be located between the line terminal 114 and the capacitors 118 and 120 (e.g., the relays 122 and 124 may located on the same sides of the capacitors 118 and 120 to work together). In some embodiments, the assembly 100 may include only the single relay 122 for selectively coupling the capacitor 120 with the auxiliary winding 110 (e.g., while the capacitor 118 is always coupled with the auxiliary winding 110). In other embodiments, a switch may be located between the line voltage source 116 and the line terminal 114, with one or more (or all) of the other switches removed.

Each relay 122 and 124 may include any suitable switching device, such as a double-throw relay. The relays 122 and 124 may be solid state (SS) switches, and may include any suitable semiconductor devices such as a bipolar-junction transistor (BJT), a field-effect transistor (FET), etc.

A control circuit 126 is coupled to control switching operation of the relay 122 and the relay 124. The control circuit 126 is configured to close the relay 122 in response to detection of excess load condition criteria, and to subsequently open the relay 122 in response to detection of normal load condition criteria. The excess load condition criteria may include any suitable one or more criterions indicative of an excess load condition of the compressor motor 102, such as a voltage of the main winding 104, a voltage of the auxiliary winding 110, a voltage at the capacitor 118, a voltage at the capacitor 120, a rotation speed of the compressor motor 102, a phase angle, a torque angle, a current, a temperature, etc. The criteria may be detected directly via one or more sensors, estimated based off of other detected parameters, combined in a multidimensional polynomial equation, mapped to a two or more dimensional space to define thresholds, etc.

For example, a voltage of the main winding 104, a voltage of the auxiliary winding 110, and a phase angle between the voltages, may be used to estimate a speed, torque, etc. of the compressor motor 102. If the estimated speed drops below a threshold value (e.g., such as less than 500 revolutions per minute, etc.), an excess load condition may be indicated. In some implementations, if the voltage of the main winding 104 and/or the voltage of the auxiliary winding 110 drops below a low voltage threshold, an excess load condition may be indicated. In various implementations, the speed of the motor 102 may be determined based on only the voltage of the auxiliary winding 110 (e.g., if the line voltage is fixed or known and the capacitance value of the capacitor 118 and/or 120 is known). If capacitance values of the capacitors 118 and 120 are fixed or already known, a rotational speed of the motor 102 may optionally be determined based on voltages of the main winding 104 and the auxiliary winding 110. In various implementations, the detected voltages may be measured/determined as root mean square (RMS) voltages. As another option, a voltage of the capacitor 118 and/or the capacitor 120 (such as RMS capacitor voltages) may be used in the polynomial equation to provide the estimate of motor parameters. For example, the control circuit 126 may receive the RMS voltage of the capacitor 118 and/or the capacitor 120 (instead of or in addition to determining the phase difference between the main and auxiliary winding voltages), and predict a rotational speed of the motor 102 based on the capacitor RMS voltage(s), the voltage of the main winding 104, and the voltage of the auxiliary winding 110.

The normal load condition criteria may include any one or more of the example criterions discussed above for the excess load condition, or other suitable criterions. The normal run condition criteria and the excess load condition criteria may use the same or different criterion(s). In various implementations, the normal run condition criteria and the excess load condition criteria may have adjacent boundaries, such as the estimated speed of the compressor motor 102 being indicative of normal run condition criteria when above a threshold such as 500 RPM, and the speed being indicative of excess load condition criteria when below 500 RPM. In some implementations, hysteresis may be used between boundaries of the normal run condition criteria and the excess load condition criteria.

The control circuit 126 may be configured to close the relay 122 during an initial startup time period of the compressor motor 102, and subsequently open the relay 122 in response to a detection of startup condition criteria. The startup condition criteria may include one or more of the example criterions discussed above for the excess load condition and normal run condition, or other suitable criterions.

For example, the startup condition criteria may include at least one the voltage of the at least one of the main winding 104 and the auxiliary winding 110 exceeding start voltage threshold(s), an expiration of the initial startup time period, a determined speed of the compressor motor exceeding a start speed threshold (e.g., 1500 RPM), etc. In some implementations, the control circuit 126 may wait a specified time period after line voltage is initially supplied (e.g., approximately 500 milliseconds, up to two seconds, etc.), and then measure on or more parameters to confirm the compressor motor 102 has started successfully.

As described above, the assembly 100 uses at least two capacitors 118 and 120 (which may be part of a single unit, multi-capacitor device, as described further below), to provide multiple run capacitance values. In some implementations, additional capacitors and relays may be used to provide additional levels of selective capacitance values for driving the auxiliary winding 110. The capacitor 118 may be generally connected to the auxiliary winding 110, while the control circuit 126 may selectively connect the capacitor 120 in parallel with the capacitor 118 during startup and low voltage (e.g., maximum load) conditions, to provide multiple capacitance values during runtime of the compressor motor 102.

The assembly 100 may allow for improving efficiency and performance of the motor 102 during different states of operation of the motor 102, compared to use of only a single capacitor 118 (or only connecting the capacitor 120 during startup of the motor 102). The capacitance values may be selected to optimize performance of the motor 102 during normal runtime loads, while also being able to accommodate maximum loads on an as needed basis, thereby allowing more efficient design of the motor operation.

For example, the motor 102 may be designed to maximize torque during dynamic and transient starting conditions, in addition to during maximum load conditions (and/or any range of target steady state load conditions). In some embodiments, the capacitors 118 and 120 may have the same capacitance value. For example, a normal operating capacitance value selected for system efficiency may be in the range of 20 uF to 50 uF, a total maximum load and starting capacitance value may be in the range of 60 uF to 150 uF, etc.

Figure 4:
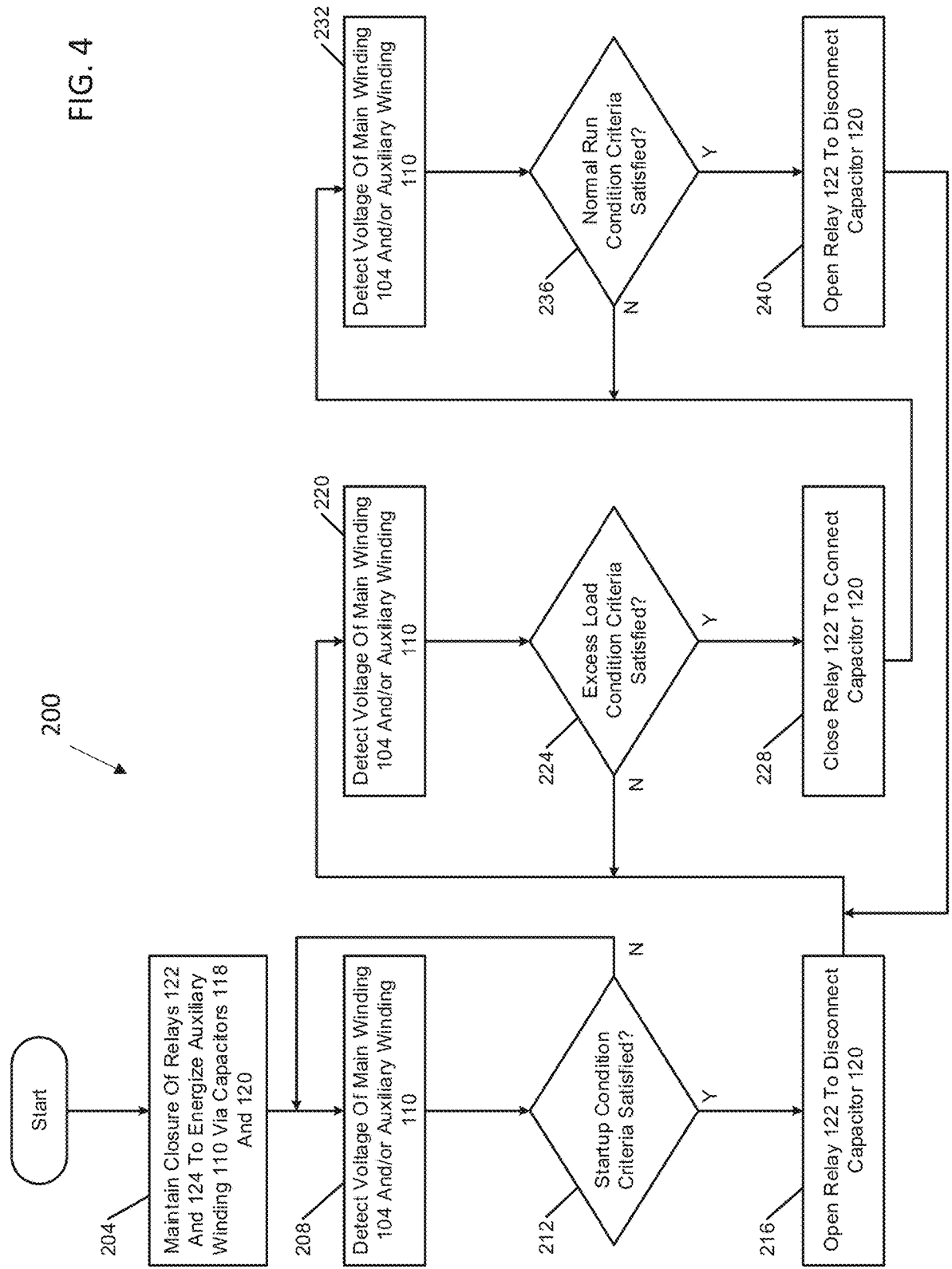
FIG. 4 is a flowchart depicting an example switching control process performed by the control circuit of FIG. 1, according to another example embodiment of the present disclosure.

FIG. 4 illustrates an example control process 200, which may be performed by the control circuit 126 to operate the switches 122 and/or 124. The process 200 starts at 204, in response to startup of the motor 102. At 204, the control circuit 126 closes the relays 122 and 124 (or maintains the relays in a closed state) to supply power to the auxiliary winding 110 via the capacitors 118 and 120.

At 208, the control circuit 126 detects a voltage of at least one of the main winding 104 and the auxiliary winding 110. For example, the control circuit 126 may detect a voltage across each winding, a back electromagnetic force (EMF) of each winding, etc.

The control circuit 126 determines whether the startup condition criteria is satisfied, at 212. If not, the control circuit 126 returns to 208 to again detect the voltage of the main winding 104 and/or the auxiliary winding 110, to wait for the motor 102 to complete the startup process. The control circuit 126 may implement a delay period between each measurement of the voltage(s), to reduce the frequency of voltage measurements.

As described above, the detected voltage(s) may be considered as at least a portion of startup condition criteria for determining whether the motor 102 has completed the startup process, where other suitable criteria may include a speed of the motor, a current of the motor, an elapsed time since power was initially supplied to the motor, a phase angle, etc.

Once the startup condition criteria is satisfied at 212, the control circuit proceeds to 216 to open the relay 122 and disconnect the capacitor 120. At that point, only the capacitor 118 is used to supply power to the auxiliary winding 110 for normal run operation.

At 220, the control circuit 126 detects the voltage of the main winding 104 and/or the auxiliary winding 110. At 224, the control circuit 126 determines whether the excess load condition criteria is satisfied. If not, the control circuit 126 returns to 220 to again detect the voltage of the main winding 104 and/or the auxiliary winding 110. The control circuit 126 may implement a delay period between each measurement of the voltage(s), to reduce the frequency of voltage measurements.

If the control circuit 126 determines that the excess load condition criteria is satisfied (e.g., to indicate that a maximum load condition has occurred), the control circuit 126 proceeds to 228 to close the relay 122 and connect the capacitor 120 to supply power to the auxiliary winding 110. As described further below, closing the relay 122 (and/or opening the relay 122), may include a specific timing sequence of opening and/or closing the relays 122 and 124 to avoid voltage and current issues that may otherwise occur. In this manner, multiple run capacitance values may be used, where the capacitor 120 is selectively added in parallel to the capacitor 118 when a low voltage (e.g., maximum load) condition occurs.

As described above, the detected voltage(s) may be considered as at least a portion of excess load condition criteria for determining whether the motor 102 is experiencing a low voltage load condition (e.g., due to a maximum load), where other suitable criteria may include a speed of the motor, a current of the motor, a phase angle, etc.

The control circuit then detects the voltage of the main winding 104 and/or the auxiliary winding 110, at 232. At 236, the control circuit 126 determines whether the normal run condition criteria is satisfied. If not (e.g., the maximum load condition is still ongoing), the control circuit 126 returns to 232 to again detect the voltage of the main winding 104 and/or the auxiliary winding 110. The control circuit 126 may implement a delay period between each measurement of the voltage(s), to reduce the frequency of voltage measurements. In some implementations, hysteresis, a minimum load condition time period, etc., may be used to inhibit the control circuit 126 from oscillating between opening and closing the relay 122 in a continuous cycle.

If the control circuit 126 determines that the normal run condition criteria is satisfied (e.g., to indicate that the maximum load condition has ended), the control circuit 126 proceeds to 240 to open the relay 122 and disconnect the capacitor 120, in order to stop the supply of power to the auxiliary winding 110 via the capacitor 120. The control circuit 126 then returns to 220 to monitor for another low voltage (e.g., maximum load) condition of the motor 102.

In some embodiments, the detected voltage(s) may be considered as one or more normal run criteria for determining whether the motor 102 has returned to a normal run operation (e.g., the maximum load condition has ended), where other suitable criteria may include a speed of the motor, a current of the motor, etc.

In some embodiments, the control circuit 126 may be optionally configured to receive a current value indicative of a current through the main winding 104, and another current value indicative of a current through the auxiliary winding 110. The control circuit may open the relay 124 (and possibly the relay 122), in response to at least one of the current values exceeding a current overload threshold.

An example layout for the main and auxiliary windings of the motor 102, and a rotor body 115 of the motor 102, are illustrated in FIGS. 2 and 3. For example, the motor 102 includes a rotor body 115 located concentrically within the opening 112 of the stator core 103. The rotor body 115 includes an external surface that faces the stator core 103.

The plurality of teeth 108 extend radially inward from the stator yoke 106. The plurality of teeth 108 define the boundaries of the winding slots 97 that are each located between adjacent teeth 108. Collectively, interior ends of the plurality of teeth 108 define the central opening 112 that receives the rotor body 115. Each slot 97 has a proximate end nearest the central opening 112, and a distal end radially distant from the central opening 112. Although the teeth 108 and the winding slots 97 are illustrated as being equally spaced circumferentially about the stator core 103, in other embodiments various other known teeth and slot configurations may be used.

As used herein, the terms about and substantially may include manufacturing tolerances, within plus or minus one percent, within plus or minus five percent, etc. Example dimensions and values used herein are for purposes of illustration only, and other embodiments may have smaller or larger dimensions or values.

FIG. 3 illustrates an example winding pattern for the main winding 104 including opposing sections 104a and 104b, and the auxiliary winding 110 (which may be referred to as a start winding) including opposing sections 110a and 110b. The windings may be formed by looping conducting wire including aluminum about the teeth 108. For example, the conducing wire may include aluminum, copper, etc.

The main winding sections 104a and 104b form the two main poles of the motor 102. In the main winding section 104a, a main winding coil 104a-1 is located within a slot pair 97-2, where each slot in the slot pair 97-2 opposes one another. The main winding coils 104a-2, 104a-3, 104a-4, and 104a-5 are located, respectively, in the slot pairs 97-3, 97-4, 97-5, and 97-6.

In the embodiment illustrated in FIG. 3, each of the main winding coils 104a-1, 104a-2, 104a-3, 104a-4, and 104a-5 are located at the distal end of their respective slots away from central opening relative to the start winding. Alternatively, in some arrangements each of the main winding coils 104a-1, 104a-2, 104a-3, 104a-4, and 104a-5 may be located in the slots proximate the central opening 112 relative to the start winding. The main winding sections 104b-1 through 104b-5 are similarly positioned within the slots 97-2 through 97-5 on the opposite side of the stator core 103.

The start winding sections 110a and 110b collectively form two starting poles for the motor 102. In the start winding 110a, a start winding coil 110a-1 is positioned within a slot pair 97-1, where each slot in the slot pair 97-1 opposes one another. The start winding coils 110a-2, 110a-3 and 110a-4 are located, respectively, in the slot pairs 97-2, 97-3 and 97-4. The start windings 110b-1 through 110b-4 of the other start winding portion 110b are similarly located in the slots 97-1 through 97-4 on the opposite side of the stator core 103.

Figure 5:
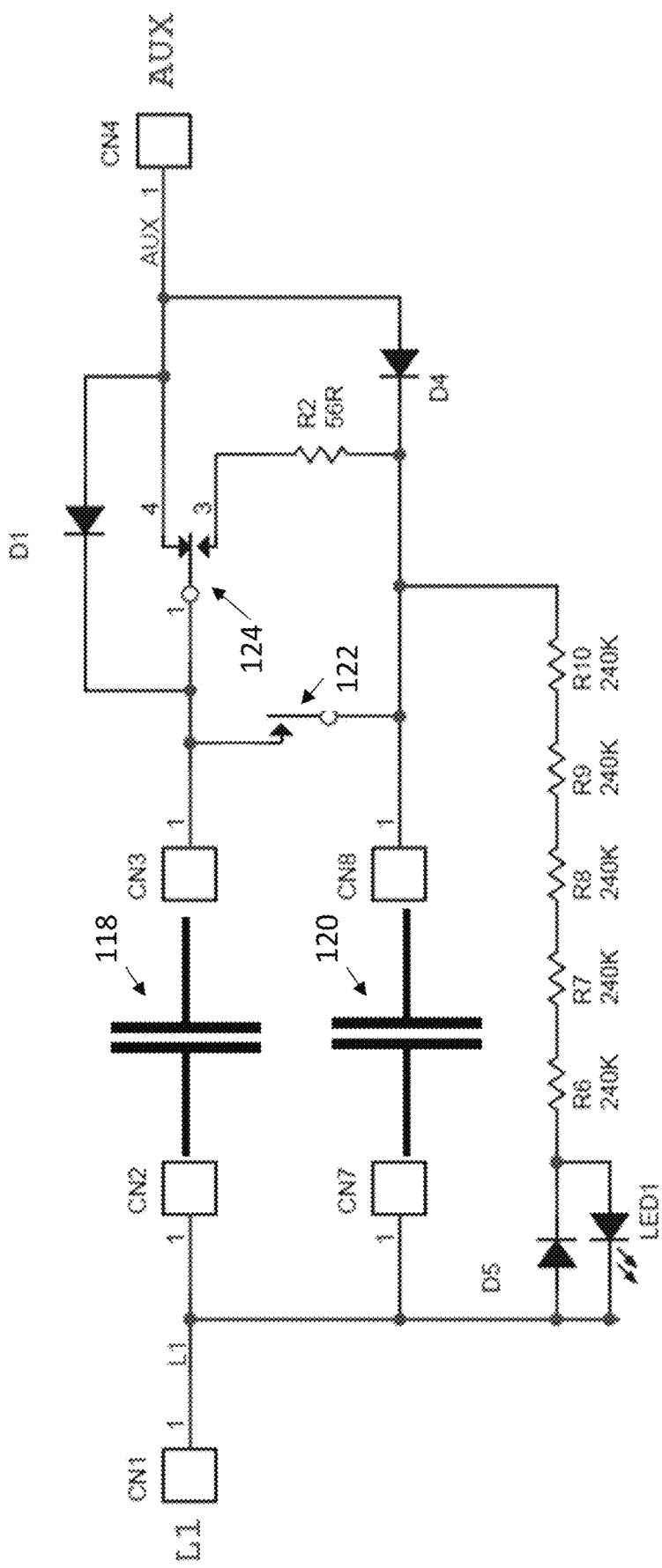
FIG. 5 is a wiring diagram illustrating example connections of the capacitors and relays of FIG. 1, according to another example embodiment of the present disclosure.

FIG. 5 is a circuit diagram showing details of example connections between the capacitors 118 and 120, and the relays 122 and 124. For example, the circuit of FIG. 5 may be used in the assembly 100 of FIG. 1. As shown in FIG. 5, the capacitor 118 is coupled between terminals CN2 and CN3 to receive power from a line voltage source L1 via the terminal CN1, and the capacitor 120 is coupled between terminals CN7 and CN8 to receive power from the line voltage source L1 via the terminal CN1.

The relay 122 is coupled to selectively connect the capacitors 118 and 120 in parallel. If only the relay 122 is used, there may be a risk that when the relay 122 is closed to couple the capacitors 118 and 120 together, very large currents may flow due to the low impedance of the capacitors 118 and 120 if the voltages across the capacitors 118 and 120 are not very close to one another. This may lead to damage or a shortened life of the capacitors 118 and 120, welded contacts, a requirement for an oversized relay 122, etc.

In view of the above, the relay 124 allows for a two-stage switching process. For example, before closing the relay 122 to couple the capacitor 120 with the capacitor 118, the relay 124 may be switched to disconnect the capacitor 118 from the auxiliary winding AUX at terminal CN4. Switching the relay 124 may connect the capacitor 118 to the capacitor 120 via the resistor R2, in order to limit current while the voltages across the capacitors 118 and 120 are balanced. Disconnecting the auxiliary winding AUX may stop the voltages across the capacitors 118 and 120 from continually moving while they are attempting to balance.

Once the voltages across the capacitors 118 and 120 are very close (e.g., equal) to one another (which may occur after a specified voltage balancing time period has expired), the relay 122 may be closed with a reduced risk of high current. The relay 124 may then be switched back to the auxiliary winding AUX, to resume normal operation of the motor 102 while supplying power via both of the capacitors 118 and 120.

As shown in FIG. 5, a diode D1 is connected in parallel with the relay 124. Without the diode D1, there may be an issue with inductive currents that could occur when opening the relay 124. Arcing could occur to cause damage. The diode D1 assists in reducing these issues. In particular, the relay 124 may be switched while current is flowing in the diode conduction direction. Current may then continue through the diode D1 instead of arcing across the relay.

If the relay 124 is opened before the current wants to reverse, the current may naturally stop. The capacitor 118 may charge up, but there will be no further current once the capacitor 118 reaches full voltage. In that case, there may not be a need for precise timing of the switching of the relay 124.

In some embodiments, the relay 122 and/or 124 may be switched at less than maximum current (e.g., at approximately zero current). For example, the control circuit 126 may detect a voltage of the line voltage source L1, and/or a voltage of the auxiliary winding AUX, and then switch the relay 122 and/or 124 when the detected voltage is within a peak voltage range (such as a peak voltage value, a range of 50% to 100% of the peak voltage value, a minimum negative value, etc.).

Energy dissipation in the resistor R2 may be large if the polarities of the voltages on the capacitors 118 and 120 are very large and opposite when they are switched together (which may create a largest delta value), which could require a more expensive and larger resistor R2. As shown in FIG. 5, a diode D4 may be coupled between the resistor R2 and the auxiliary winding AUX to help address this issue. The diode D4 may reduce an amount of time for a sufficient voltage balance to occur.

For example, the diode D4 may cause the capacitors 118 and 120 to have a very similar voltage when they are switched together, which may allow for a smaller and lower cost resistor R2 to be used. When switching out the capacitor 120, the diode D4 may reduce (e.g., avoid) issues of bounce on the relay 122 (e.g., if Va-m increases). FIG. 5 also illustrates other optional circuit components, including a diode D5, an LED1 (e.g., to show when a high voltage is present), and resistors R6, R7, R8, R9 and R10 (e.g., to discharge the capacitor 120).

Figure 6:
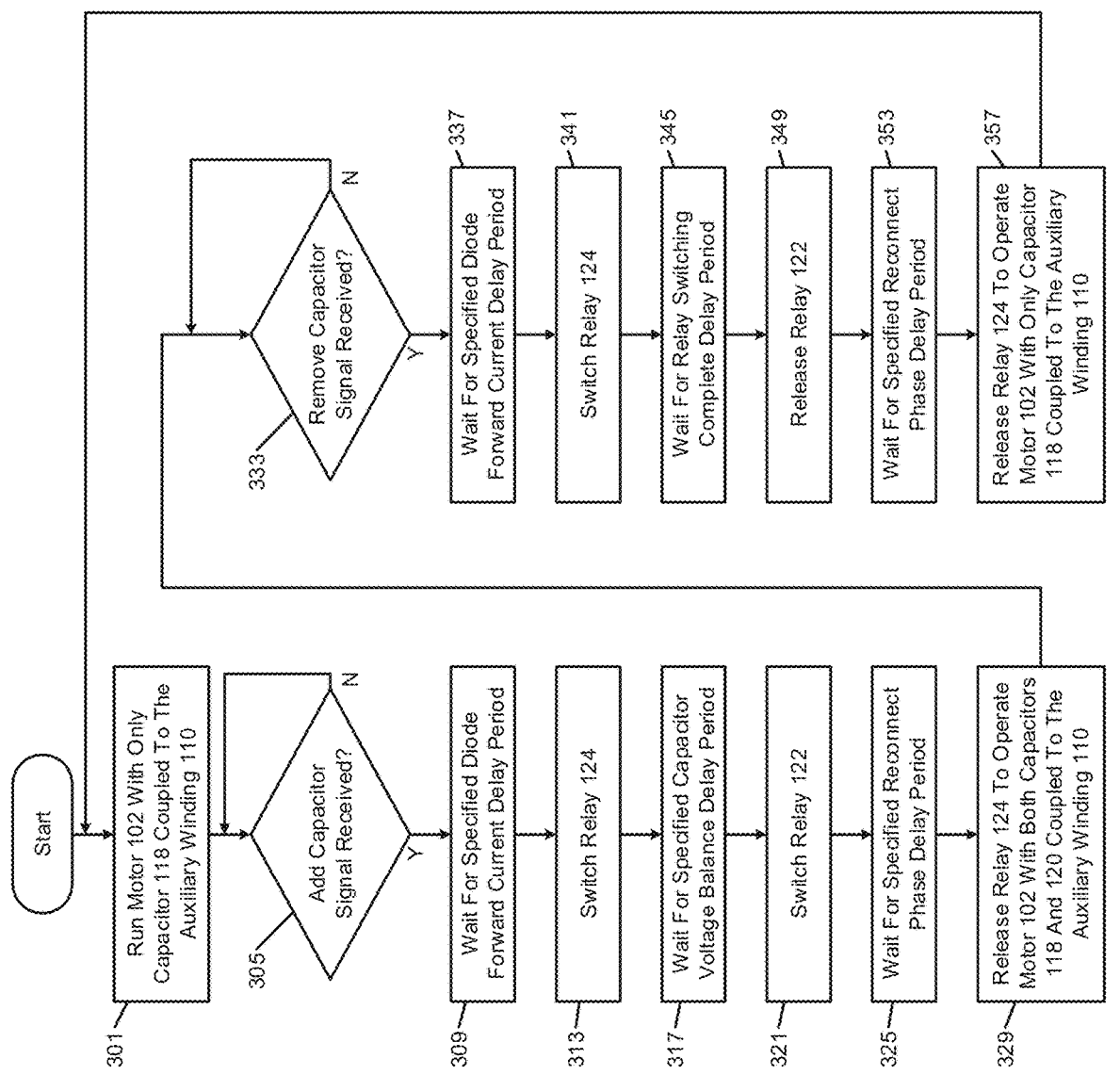
FIG. 6 is a flowchart depicting an example switching process for the relays of FIG. 5.

FIG. 6 illustrates an example process for controlling switching of the relays 122 and 124. The example process may be performed by the control circuit 126 in some implementations. The process starts at 301 by running the motor 102 with only the capacitor 118 coupled to the auxiliary winding 110. For example, the relay 124 may be closed while the relay 122 is open.

At 305, the control circuit 126 waits to receive a signal indicating that the second capacitor 120 should be coupled to the auxiliary winding 110 (e.g., in response to a detection of excess load condition criteria, etc.). Once the add capacitor signal is received, the control circuit waits for a specified diode forward current delay period at 309. After the forward current delay period expires, the control circuit 126 switches the relay 124, at 313.

At 317, the control circuit waits for a specified capacitor voltage balance delay period. The delay period may be a period of time needed for the voltages on the capacitors 118 and 120 to become substantially balanced as current travels through the switched relay 124, etc. The delay period may include a time needed to switch the relay 124.

After the capacitor voltages are substantially balanced, the control circuit switches the relay 122, at 321, in order to couple the capacitors 118 and 120 via the relay 122. The control circuit 126 then waits for a specified reconnect phase delay period at 325. The phase delay period may include a time needed to switch the relay 122, a time needed to reach the correct phase angle, etc. The control circuit 126 then releases the relay 124 at 329, to operate the motor 102 with both capacitors 118 and 120 coupled to the auxiliary winding 110.

At 333, the control circuit 126 waits to receive a remove capacitor signal, indicating that the capacitor 120 should be decoupled from the auxiliary winding 110 (e.g., in response to detection of normal run condition criteria, etc.). After the remove capacitor signal is received at 333, the control circuit waits for a specified diode forward current delay period at 337.

The control circuit 126 then switches the relay 124, at 341. After waiting at 345 for a delay period corresponding to a time needed to complete switching of the relay 124, the control circuit 126 releases the relay 122 at 349, to decouple the capacitor 120 from the capacitor 118. The control circuit 126 then waits for a specified reconnect phase delay period at 353, before releasing the relay 124 at 357 to operate the motor 102 with only the capacitor 118 coupled to the auxiliary winding 110.

Figure 13:
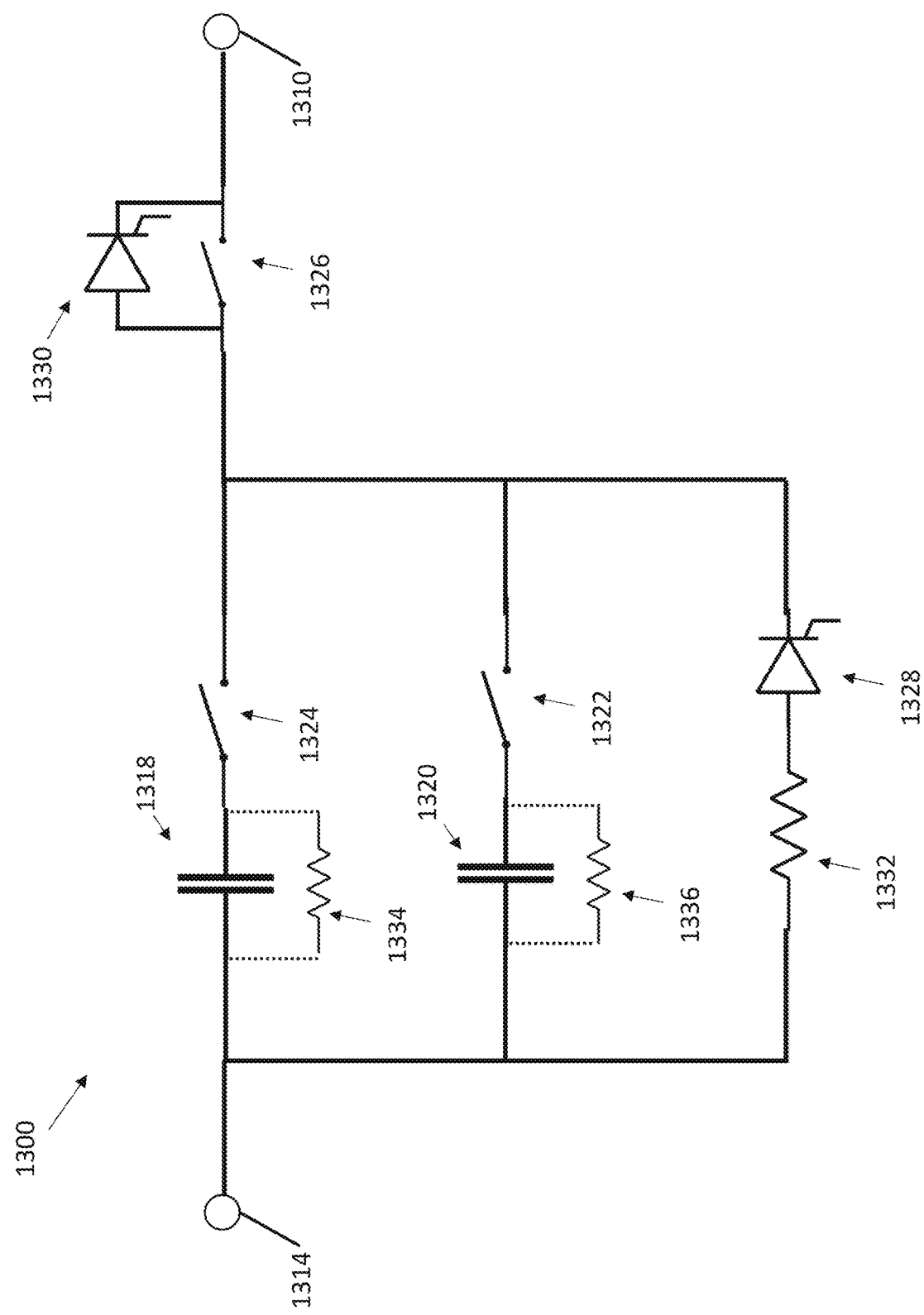
FIG. 13 is a wiring diagram illustrating example connections of the capacitors and relays of FIG. 1 in a circuit including two thyristors, according to another example embodiment of the present disclosure.

FIG. 13 is a wiring diagram illustrating another embodiment of a circuit 1300 for controlling switching of relays coupled with the capacitors, which includes two thyristors 1328 and 1330. For example, the circuit 1300 may be used with the assembly 100 to control connections of the capacitors 118 and 120 with the auxiliary winding 110.

As shown in FIG. 13, the circuit 1300 is coupled between a line terminal 1314 and an auxiliary winding 1310. The circuit 1300 includes a first capacitor 1318 coupled with a first relay (e.g., switch) 1324, and a second capacitor 1320 coupled with a second relay 1322. The series-connected relay 1324 and capacitor 1318 are coupled in parallel with the series-connected relay 1322 and capacitor 1320, and also in parallel with a series-connected resistor 1332 and thyristor 1328. The circuit 1300 also includes a relay 1326 coupled with the auxiliary winding 1310. The relay 1326 is coupled in parallel with a thyristor 1330.

The thyristors 1328 and 1330 may include any suitable type of thyristor, such as a silicon-controlled rectifier (SCR) or triode for alternating current (TRIAC). For example, the thyristor 1328 may be a solid-state semiconductor device with four layers of alternating P-type and N-type materials. The thyristor 1328 may act as a bistable switch that conducts when the gate receives a current trigger, and continues to conduct until the voltage across the device is reversed biased or the voltage is removed by some other means. In a three-lead thyristor, a small current on the gate may control a larger current of the anode to cathode path. In a two-lead thyristor, conduction may begin when the potential difference between the anode and cathode is sufficiently large (e.g., a breakdown voltage).

In various implementations, each relay 1322 and 1324 may include any suitable relay device, such as a double pole relay. An optional resistor 1334 may be coupled in parallel with the capacitor 1318, and an optional resistor 1336 may be coupled in parallel with the capacitor 1320, for discharge if a sudden reset occurs. The resistors 1332, 1334 and 1336 may have any suitable resistance values, which may be selected to avoid continuous power loss, etc.

Figure 14:
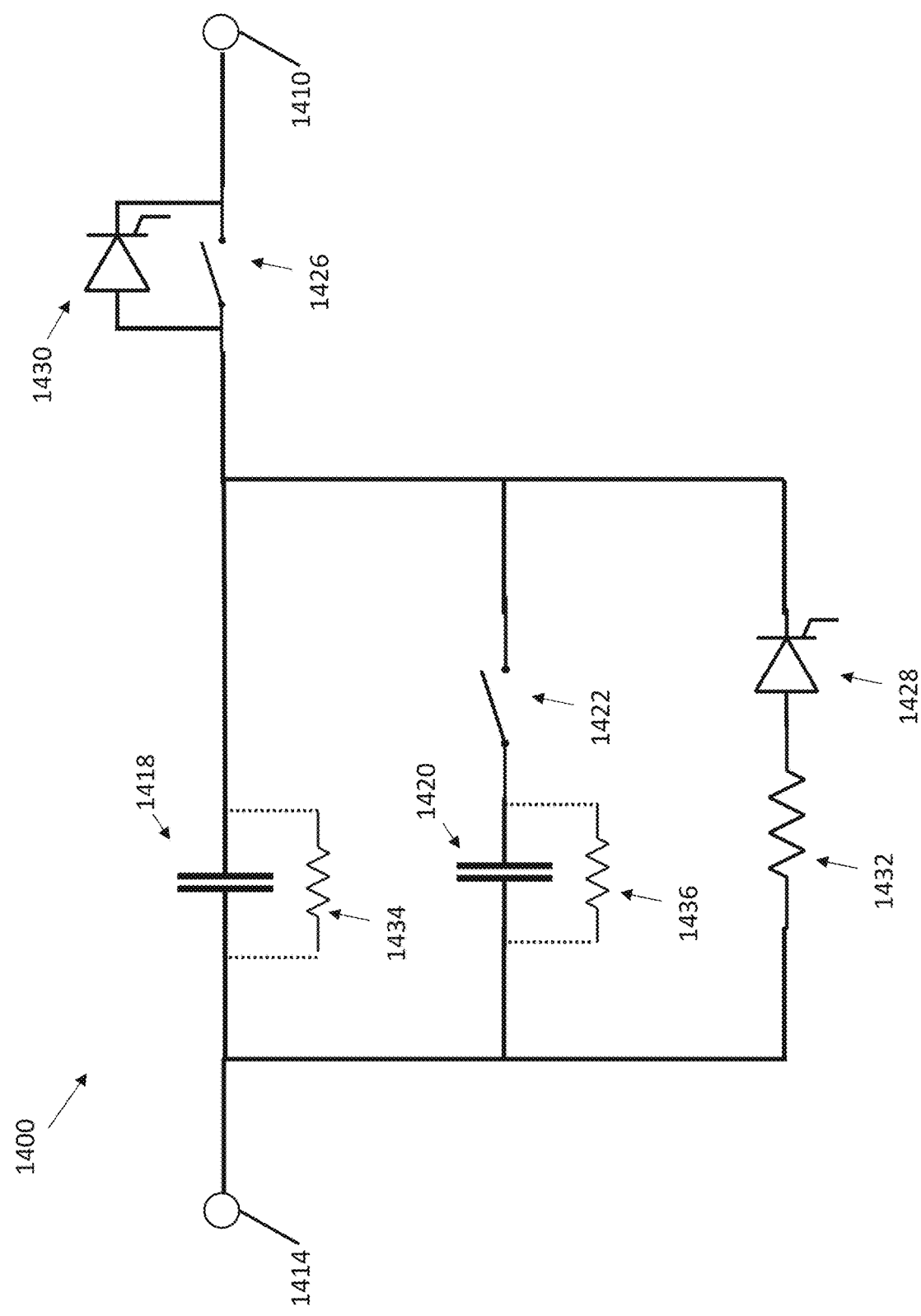
FIG. 14 is a wiring diagram illustrating example connections of the capacitors and relays of FIG. 1 with one capacitor always connected, according to another example embodiment of the present disclosure.

FIG. 14 is a wiring diagram illustrating another embodiment of a circuit 1400 for controlling switching of relays coupled with the capacitors, which includes one capacitor 1420 coupled with a relay 1422, and another capacitor 1418 that is not series-connected with a relay. The circuit 1400 may be similar to the circuit 1300 of FIG. 13, but with the capacitor 1418 always electrically coupled between the line terminal 1414 and the relay 1426.

As shown in FIG. 14, the capacitor 1418 is coupled in parallel with the series-connected relay 1422 and capacitor 1420, and also in parallel with a series-connected resistor 1432 and thyristor 1428. The circuit 1400 also includes a relay 1426 coupled with the auxiliary winding 1410. The relay 1426 is coupled in parallel with a thyristor 1430.

In various implementations, an optional resistor 1434 may be coupled in parallel with the capacitor 1418, and an optional resistor 1436 may be coupled in parallel with the capacitor 1420, for discharge if a sudden reset occurs. The resistors 1432, 1434 and 1436 may have any suitable resistance values, which may be selected to avoid continuous power loss, etc.

As described herein, the example control circuits may include a microprocessor, microcontroller, integrated circuit, digital signal processor, etc., which may include memory. The control circuits may be configured to perform (e.g., operable to perform, etc.) any of the example processes described herein using any suitable hardware and/or software implementation. For example, the control circuits may execute computer-executable instructions stored in a memory, may include one or more logic gates, control circuitry, etc. In some embodiments, the control circuit 126 and/or the relays 122 and 124 may include an analog circuit implementation, a digital circuit implementation, a coordinated switching logic circuit, a low current switching device, etc.

Figure 7:
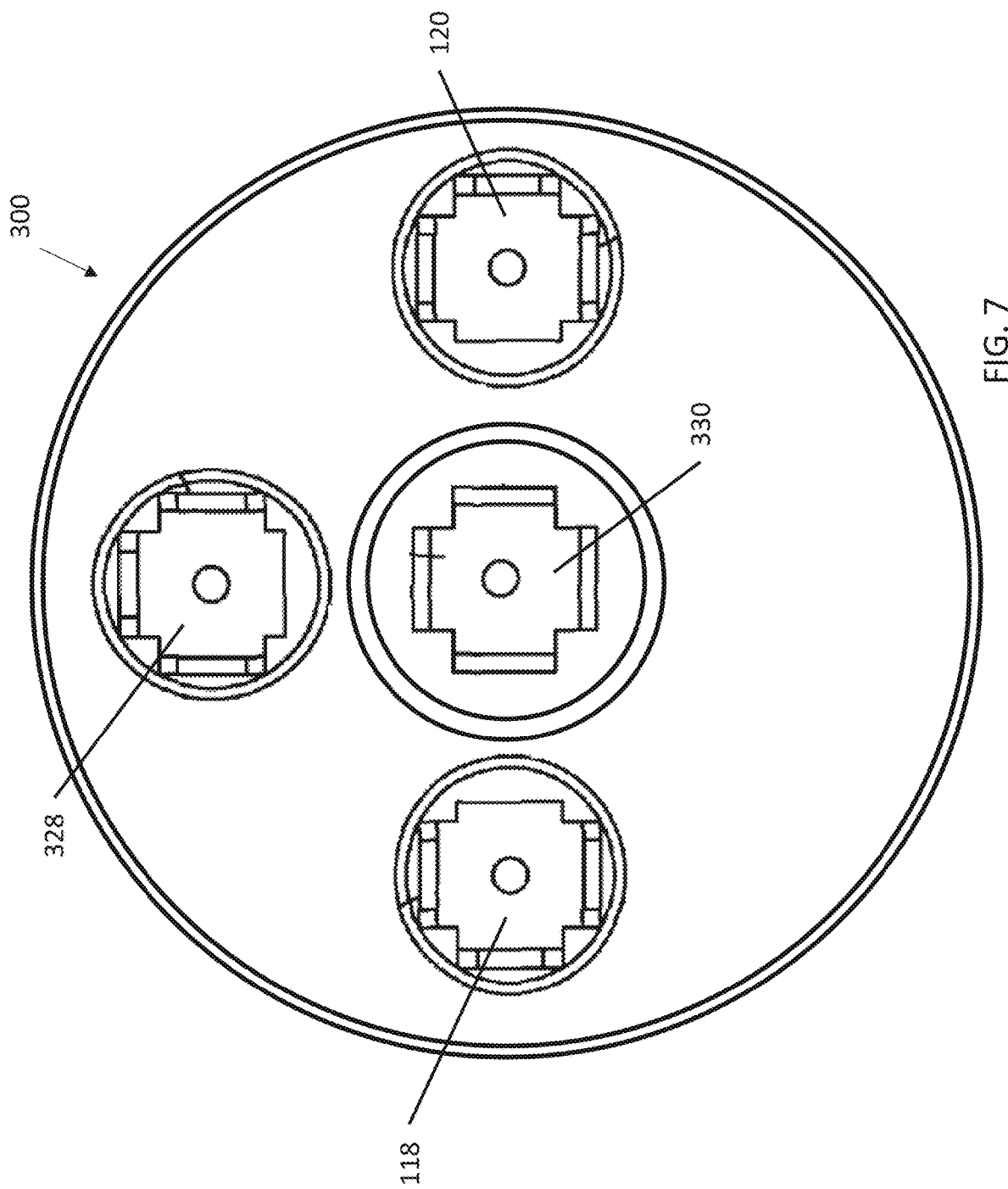
FIG. 7 is a top view of an example single unit multi-capacitor device.

FIG. 7 illustrates a top view of an example integral multi-capacitor device 300, which may be used in the assembly 100 of FIG. 1. As shown in FIG. 7, the device 300 includes multiple capacitors (e.g., capacitor films, etc.) in a single unit.

The device 300 may include the capacitor 118 and the capacitor 120 of the assembly of FIG. 1, as well as a third capacitor 328. For example, a single multi-capacitor device 300 may be used to provide the capacitors 118 and 120 to facilitate multiple run capacitance values for the auxiliary winding 110 of the compressor motor 102 of FIG. 1, while a third capacitor 328 is used to supply power to a fan motor of a condenser unit that includes the compressor motor 102 (for example, as shown in FIG. 8).

The device 300 also includes a common terminal 330. Although FIG. 7 illustrates three capacitors 118, 120 and 328 in a single unit, other embodiments may include more or less capacitors, which may provide more or less run capacitance values for the auxiliary winding 110 of the compressor motor 102.

Figure 8:
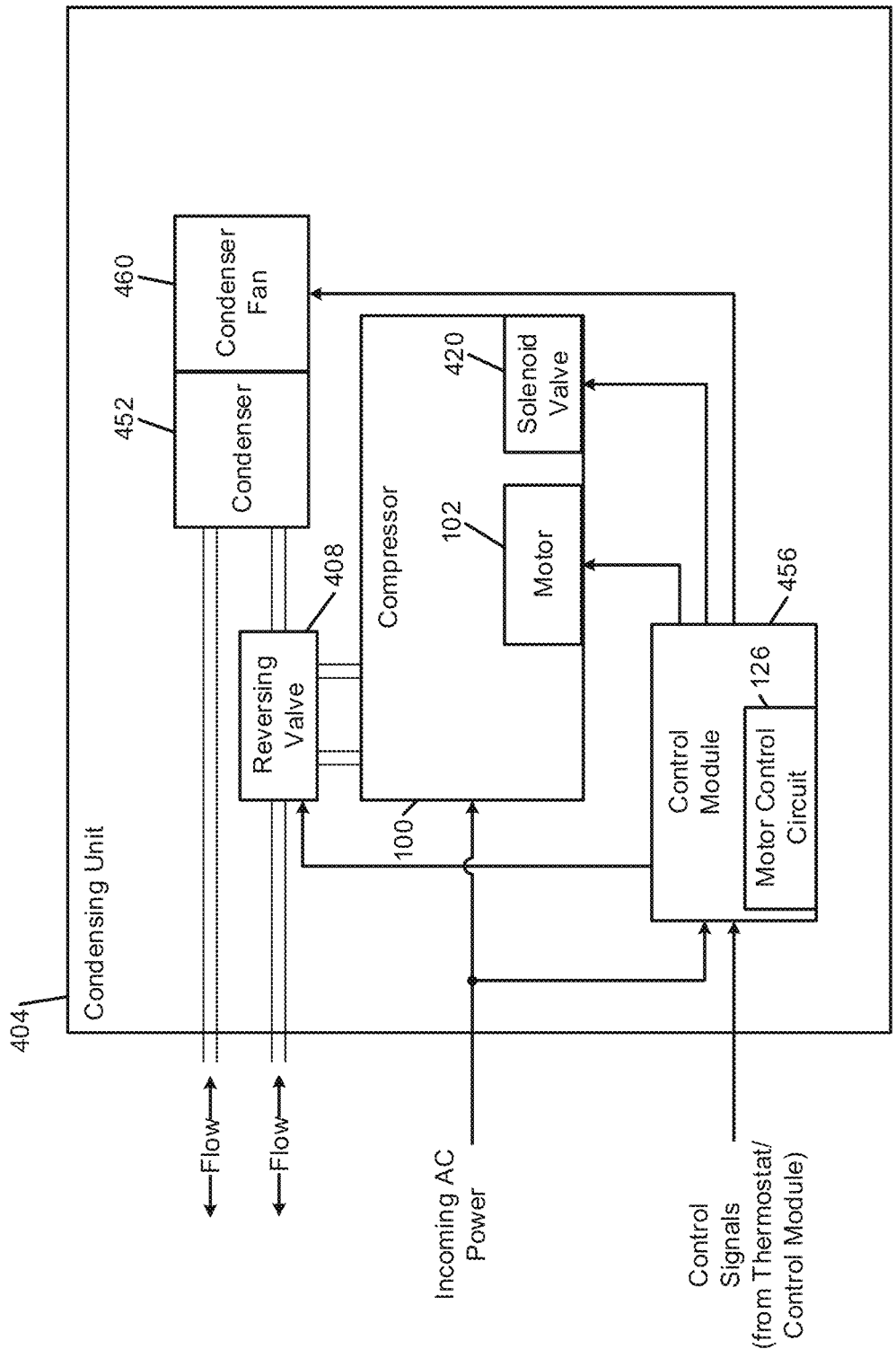
FIG. 8 is a block diagram of an example condensing unit including the compressor assembly of FIG. 1.

FIG. 8 is a functional block diagram of an example condensing unit 404 of an example HVAC system, which may include the compressor assembly 100 and compressor motor 102 of FIG. 1. Although referred to as the condensing unit 404, the mode of a heat pump determines whether the condenser 452 of the condensing unit 404 is actually operating as a condenser or as an evaporator. A reversing valve 408 is controlled by the control module 456 and determines whether the compressor assembly 100 discharges compressed refrigerant toward the condenser 452 (cooling mode) or away from the condenser 452 (heating mode). The control module 456 controls the reversing valve 408 and the compressor assembly 100 based on the control signals. The control module 456 may receive power, for example, from a transformer (not shown) of an air handler unit, or via an incoming AC power line. The control module 456 includes a motor control circuit 126 for controlling the motor 102. In various implementations, the control circuit 126 may be located in other parts of the condensing unit 404, such as with the compressor assembly 100, etc.

The compressor assembly 100 includes the compressor motor 102, and a solenoid valve 420. The motor 102 may operate at, for example, approximately 40 hertz (Hz) in low stage and approximately 50-60 Hz in mid and high stage. The control module 456 receives control signals from, for example, a thermostat or a control module of an air handler unit. The control signals include demand signals indicating a stage for operation of the compressor assembly 100. The control module 456 may also control a condenser fan 460, which increases heat exchange between the condenser 452 and outside air.

Figure 9:
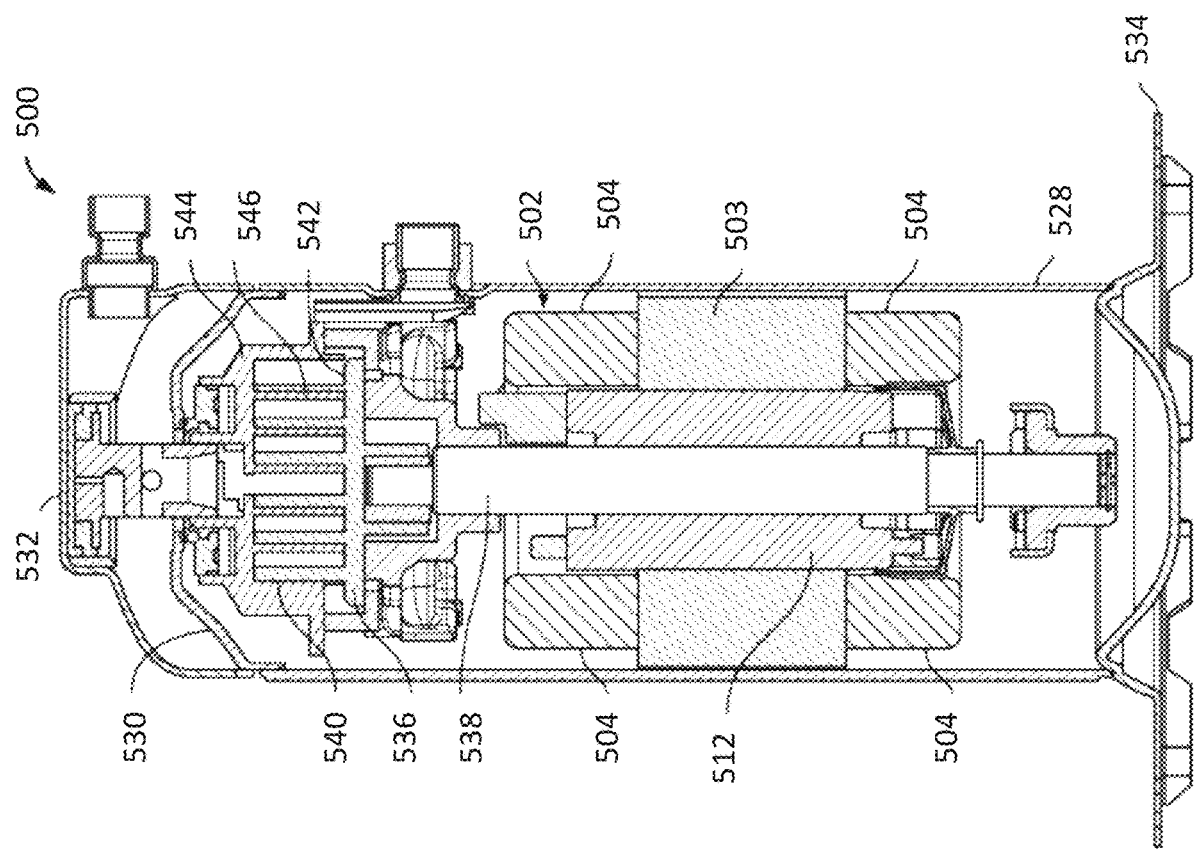
FIG. 9 is a cross sectional view of a scroll compressor according to another example embodiment of the present disclosure.

FIG. 9 illustrates a compressor 500, according to another example embodiment. As shown in FIG. 8, the compressor 500 includes a cylindrical shell 528, a partition 530 connected to an upper end of the shell, a lid 532 connected to the partition 530 and a base 534 connected to a lower end of the shell 528. The motor 502 is configured to drive an orbital scroll member 536. The motor 502 includes a stator assembly 503, windings 504 wound about the stator assembly 502, and a rotor 512 coupled to a drive shaft 538. For example, the motor 502 may be similar to the motor 102 illustrated in FIGS. 1-3.

The motor 502 communicates mechanical energy to the orbiting scroll member 536 via the drive shaft 538. The orbital scroll member 536 has a spiral vane 540 extending upward from an end plate 542. A non-orbiting scroll member 544 includes a vane 546 extending downward in meshing engagement with the orbital scroll member 536. The interaction between the scroll members 536 and 544 may broadly be defined as a pump.

The compressor 500 is illustrated as a scroll compressor (e.g., a hermetically sealed compressor). In other embodiments, other types of compressor apparatuses may be used where a single phase induction is coupled to drive a compression unit. A pump apparatus may include a pump and a single phase induction motor coupled to drive the pump. The motor 502 may be a permanent split capacitor (PSC) motor that is hermetically sealed in a single-phase compressor.

Figure 10:
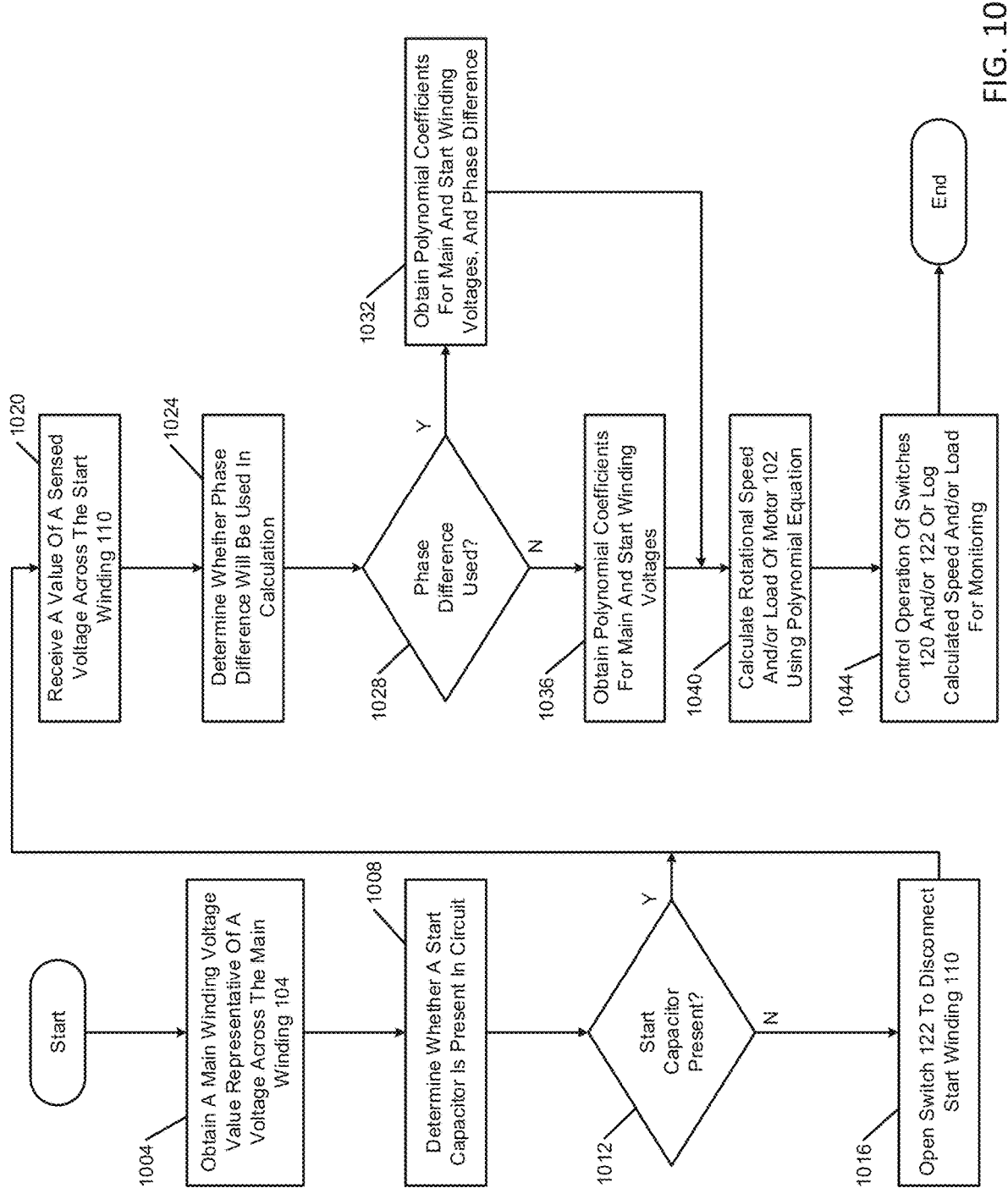
FIG. 10 is a flowchart depicting an example control process performed by the control circuit of FIG. 1, according to another example embodiment of the present disclosure.

FIG. 10 illustrates an example control process, which may be performed by the control circuit 126 to operate the switches 122 and/or 124. The process starts at 1004, by obtaining a main winding voltage value representative of a voltage across the main winding 104. At 1008, the control circuit determines whether a start (e.g., auxiliary) capacitor is present. In various implementations, if the circuit is known to include a start capacitor, the control circuit 126 may automatically proceed from 1004 to 1020 without an explicit determination of whether the capacitor is present (e.g., because software of the control circuit does not need to execute an if statement to check for the start capacitor if control circuit is already programmed according to knowledge that the start capacitor is present in the circuit).

If the start capacitor is not present at 1012, the control circuit 126 opens the switch 124 at 1016 to disconnect the auxiliary winding 110, prior to receiving a value of the sensed voltage across the auxiliary winding 110, at 1020. If the start capacitor is present at 1012, the control circuit 126 proceeds directly to 1020 to receive the value of the sensed voltage across the auxiliary winding 110.

At 1024, the control circuit 126 determines whether a phase difference will be used in the calculation of the motor rotational speed or load. If the phase difference will not be used at 1028, control obtains polynomial coefficients for main and auxiliary winding voltage values at 1036. If the phase difference will be used at 1028, the control circuit 126 obtains polynomial coefficients for main and auxiliary winding voltages, as well as the phase difference, at 1032. In various implementations, the explicit step of determining whether a phase difference will be used in the calculation at 1024 may not be programmed into software of the control circuit 126 if it is already known that a phase difference will be used.

The control circuit 126 then calculates a rotational speed and/or load of the motor 102 using the polynomial equation and the obtained coefficients, at 1040. In various implementations, the rotational speed and/or load of the motor 102 may be determined without using a look up table. At 1044, the control circuit 126 controls operation of the switch 122 and/or the switch 124 according to the calculated speed and/or load, or logs the calculated speed and/or load for monitoring. For example, the calculated speed or load (or any other suitable parameter derived from the main and auxiliary voltage readings) may be used for various purposes, such as storing a history of motor parameters, displaying motor parameters for monitoring, using motor parameters to control other components, etc. Therefore, the example method of FIG. 10 may be used in other suitable embodiments that do not include the switches 122 and 124, that include switch(es) in other locations of the motor that may or may not be controlled by the control circuit 126, that do not include switches at all, etc.

As described above, the control circuit 126 may measure a voltage across the main winding 104, measure a voltage across the auxiliary winding 110, and optionally calculate a phase difference between the voltages in order to account for capacitor changes, such as variations of capacitors 118 and 120 in FIG. 1. The control circuit 126 may then use the measured and calculated values to predict a speed of the motor 102, a load of the motor 102, etc.

In various implementations, the voltage changes on the main winding 104 and/or the auxiliary winding 110 may be small, so various approaches may be used to measure the voltages more accurately. For example, AC tracking maybe used to measure voltage waveforms and determine a reference angle that can be used when calculating the phase difference between the voltages.

A filter may be used to take measurements, such as a digital filter of the control circuit 126 or a filter component coupled to the control circuit 126. This approach may be used when a slower response is acceptable, particularly if the phase difference is not required.

In various implementations, a potential divider may be used to obtain the voltages of the main winding 104 and the auxiliary winding 110. For example, a potential divider may be coupled between the control circuit 126 and the main winding 104 or auxiliary winding 110. In some embodiments, the main voltage may be a line voltage that is already being measured, so the example methods described herein may only add detection of the auxiliary winding 110.

In various implementations, main and auxiliary winding voltages may be sensed across different lines of the input power source. For example, if the line input includes a line L1 and a common line L2, the main voltage may be sensed across L1 and L2, and the auxiliary winding voltage may be sensed between an auxiliary winding and L2. This may be referred to as a main to common voltage and a start to common voltage.

An example polynomial for calculating the motor parameter(s) may be based on the voltage of the auxiliary winding 110 alone, the voltages of the auxiliary winding 110 and the main winding 104, the voltages of the auxiliary and main windings in combination with the phase difference between them, etc. For example, if values of the capacitor 118 and/or 120 are known (or the capacitor(s) 118 and/or 120 are not present in the assembly 100), the polynomial may use only the main and auxiliary winding voltages as inputs. If the line voltage is held to a high tolerance, the polynomial may use only the auxiliary winding voltage. An example polynomial is illustrated below.

$$\text{Speed} = p_0 + p_1 x + p_2 y + p_3 z + p_4 x^2 + p_5 xy + p_6 xz + p_7 y^2 + p_8 yz + p_9 z^2 + p_{10} x^3 + p_{11} x^2 y + p_{12} x^2 z + p_{13} xy^2 + p_{14} y^3 + p_{15} y^2 z + p_{16} xz^2 + p_{17} yz^2 + p_{18} z^3 + p_{19} xyz,$$
where $x$=Main voltage, $y$=Start winding voltage, $z$=Phase between main & aux voltages, and $p_0$-$p_{19}$ are coefficients   Equation 1.

In various implementations, the coefficients may be specified according to any suitable techniques, such as collecting data through initial testing of induction motors and subsequent fitting of the coefficients, etc. The equation above is an example only, and other embodiments may use other equation forms. For example, if only a rough speed prediction is needed to determine if the motor is stalling, a lower accuracy equation may be used.

Some embodiments may use multiple sets of coefficients, or multiple equation forms, to provide better fits or simpler equations. For example, one set of coefficients may be used when the motor 102 is operating in a first motor operation range (such as near full speed), while a second set of coefficients is used when the motor 102 is operating in a second motor operation range (such as near a breakdown torque).

As another example, a first set of coefficients may be used to determine a speed of the motor 102, a second set of coefficients may be used to determine a load of the motor 102, a third set of coefficients may be used to determine a capacitor value of the capacitor 118 or the capacitor 120, and a fourth set of coefficients may be used to determine a current of the motor 102. In various implementations, calculations may be reduced by reusing variable terms multiple times. In some implementations, other parameters may be derived from the speed, load, etc., such as deriving a current from the speed or load, and deriving a power of the motor 102 based on the speed and load.

In various implementations, the speed or load of the motor may be determined via the main and auxiliary winding voltage via other suitable algorithms. For example, a look up table may store speed, load, or other suitable motor parameters according to main and auxiliary winding voltages, and the control circuit 126 may use the look up table to predict the motor speed, load, etc. based on sensed main and auxiliary winding voltages.

Figure 11A:
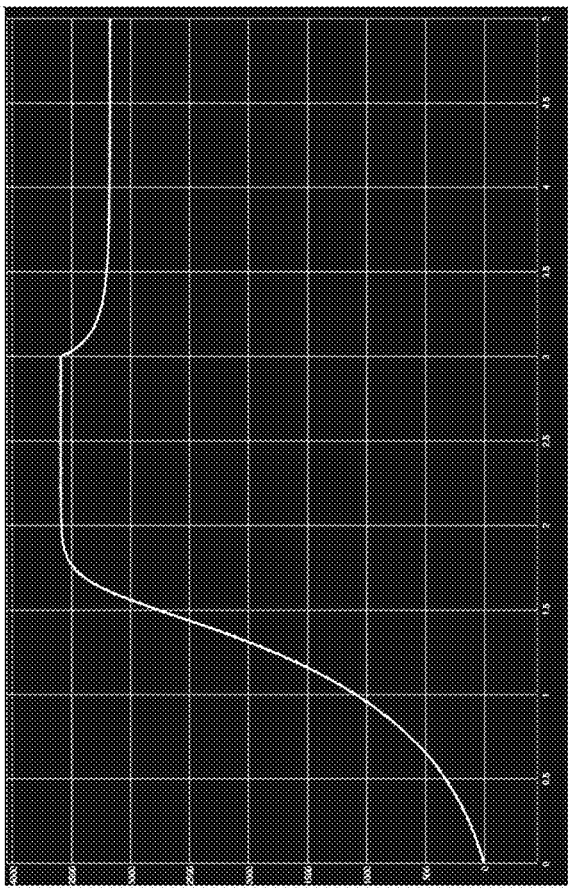
FIG. 11A is a waveform illustrating an example simulated speed of the motor of FIG. 1.

FIG. 11A illustrates an example simulated speed 1100 of the motor 102, as measured using a filter (such as a digital filter of the control circuit 126 or a filter component coupled with an input of the control circuit 126). FIG. 11A illustrates starting of the motor 102 followed by a step load. Therefore, the motor speed ramps up initially to a higher steady state speed value during startup, then drops off to a lower steady state speed after the load increases.

Figure 11B:
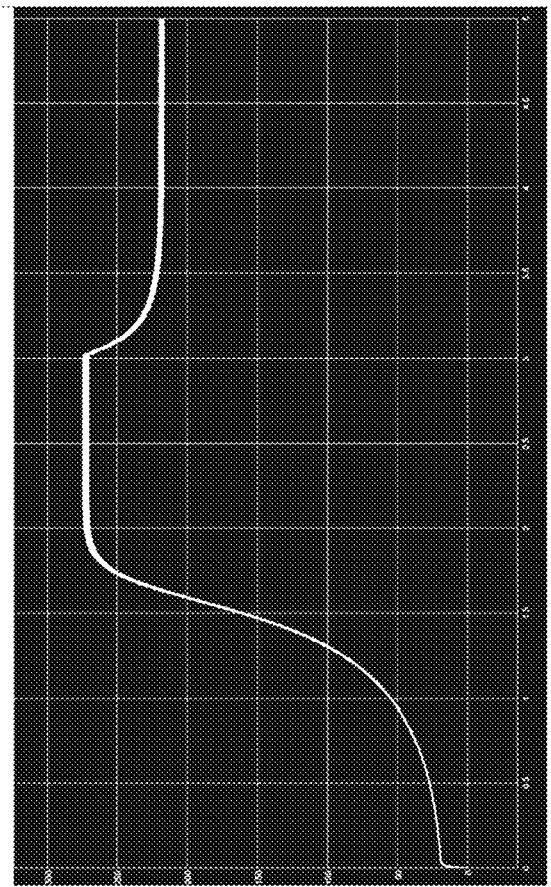
FIG. 11B is a waveform illustrating an example simulated voltage across the auxiliary winding of FIG. 1.

FIG. 11B illustrates an example simulated voltage 1102 of the auxiliary winding 110, as measured using a filter. As shown in FIG. 11B, the voltage on the auxiliary winding 110 increases initially to a higher steady state value during startup of the motor 102, then drops off to a lower steady state value after a step load is applied. The voltage waveform 1102 corresponds to the simulated speed 1100 of FIG. 11A, indicating that in this example the voltage on the auxiliary winding 110 may be used to predict the speed of the motor 102.

Figure 12:
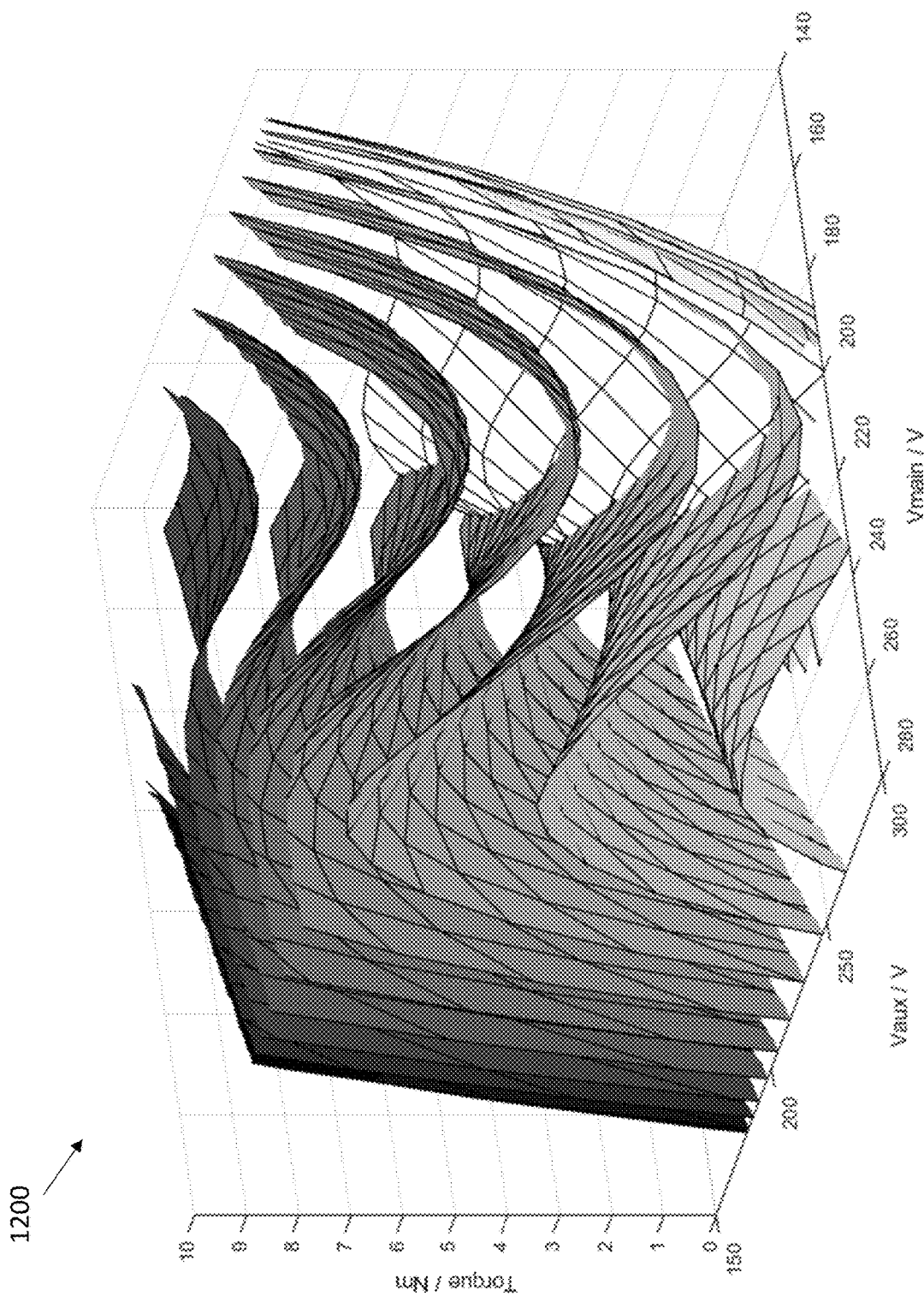
FIG. 12 is a graph illustrating example curve fitting surfaces for polynomial coefficients used for motor parameter prediction.

FIG. 12 is a graph 1200 illustrating example curve fitting surfaces for polynomial coefficients used for motor parameter prediction. For example, FIG. 12 illustrates a representation of a four dimensional surface, using multiple three dimensional surfaces. Each surface represents a different step of phase angles between the main and auxiliary winding voltages (such as 2.5 degree steps from about seventy degrees up to about one hundred degrees).

The coefficients of a corresponding polynomial are determined by fitting data points measured from motor operations values. For example, a curve fitting algorithm may be used on a set of measured motor data points at various speeds, torques, phase angles, main and auxiliary winding voltages, etc., to generate the multiple surfaces (such as by using a least squares surface fit, pseudo inverse matrix or array). Then, if main and auxiliary winding voltages are measured from a motor, and a phase angle is determined, the surfaces of the graph 1200 may be used to predict a current torque of the motor (or a current speed or other desired prediction parameter that has been modeled).

In various implementations, polynomial coefficients may be tuned to increase desired motor control performance. For example, the coefficients may be weighted in areas within the parameter space that are more important to motor operation (such as areas where the motor spends most of its time operating), or more measurements may be taken from a sample motor in the more important operation parameter areas to give better prediction accuracy for improved control. Less adjustment or precision may be needed at areas where the motor does not normally operate. For example, it may be difficult to take accurate measurements when a motor is close to stalling out, so smaller weights may be used for such areas in the parameter space.

As mentioned above, in various implementations multiple polynomial equations may be used for different situations, which have different coefficients. For example, two different sets of polynomial equations could be used for different capacitor values coupled with an auxiliary winding or main winding (such as a first set of coefficients for capacitors in a range of 25 to 45 microfarads and another set of coefficients for capacitors in a range of 125 to 185 microfarads).

According to another aspect of the present disclosure, a compressor assembly includes a compressor motor coupled to operate a compressor of a heating, ventilation and/or air-conditioning (HVAC) system. The compressor motor includes a stator core having a stator yoke and a plurality of teeth extending from the stator yoke toward a central opening. The central opening extends from a first end of the stator core to a second end of the stator core opposite the first end. The plurality of teeth are spaced apart from one another and define a plurality of slots between the plurality of teeth. The compressor motor further includes a main winding and an auxiliary winding located within the plurality of slots and wrapped around the plurality of teeth. The main winding is coupled to a line terminal to receive power from a line voltage source.

The assembly includes a first capacitor coupled between the line terminal and the auxiliary winding to supply power to the auxiliary winding from the line voltage source, a second capacitor coupled between the line terminal and the auxiliary winding to supply power to the auxiliary winding from the line voltage source, a relay coupled between the first capacitor and the line terminal or the auxiliary winding to selectively inhibit the supply of power from the line voltage source to the auxiliary winding via the first capacitor, and a control circuit coupled to control switching operation of the relay. The control circuit is configured to receive at least one of a voltage of the main winding and a voltage of the auxiliary winding, close the relay during an initial startup time period of the compressor motor, subsequently open the relay in response to detection of startup condition criteria, and close the relay in response to detection of excess load condition criteria, where the excess load condition criteria includes at least one of the received voltages of the main winding and the auxiliary winding.

In some embodiments, the control circuit is configured to, subsequent to closing the relay in response to detection of the excess load condition criteria, open the relay in response to detection of normal load condition criteria, the normal load condition criteria including at least one of the received voltages of the main winding and the auxiliary winding.

The control circuit may be configured to receive a first current value indicative of a current through the main winding, receive a second current value indicative of a current through the auxiliary winding, and open the relay in response to at least one of the first current value and the second current value exceeding a current overload threshold. In some embodiments, the first capacitor comprises a first capacitor film disposed in an integral multi-capacitor housing, and the second capacitor comprises a second capacitor film disposed in the integral multi-capacitor housing.

According to another aspect of the present disclosure, a method of controlling a compressor motor assembly is disclosed. The assembly includes a compressor motor having a stator yoke and a plurality of teeth extending from the stator yoke toward a central opening. The central opening extends from a first end of the stator core to a second end of the stator core opposite the first end, and the plurality of teeth are spaced apart from one another and define a plurality of slots between the plurality of teeth. The compressor motor further includes a main winding and an auxiliary winding located within the plurality of slots and wrapped around the plurality of teeth. The main winding is coupled to a line terminal to receive power from a line voltage source. The assembly further includes a first capacitor coupled between a line terminal and the auxiliary winding, a second capacitor coupled between the line terminal and the auxiliary winding, a first relay coupled between the first capacitor and the second capacitor, and a second relay coupled between the first capacitor and the auxiliary winding.

The method includes opening the first relay and closing the second relay during a run time period of the compressor motor, and receiving a voltage of at least one of the main winding and the auxiliary winding. In response to detection of excess load condition criteria including at least the received voltage, the method includes opening the second relay to disconnect the first capacitor from the line terminal or the auxiliary winding, closing the first relay after a specified voltage balance time period to couple the first capacitor and the second capacitor in parallel, and closing the second relay to connect the first capacitor and the second capacitor to the line terminal or the auxiliary winding, to supply power from the line terminal to the auxiliary winding via the first capacitor and the second capacitor.

In some embodiments, the method includes closing the first relay during an initial startup time period of the compressor motor, and opening the first relay in response to detection of startup condition criteria, the startup condition criteria including at least one of the received voltage and an expiration of the initial startup time period.

The method may include receiving a first current value indicative of a current through the main winding, receiving a second current value indicative of a current through the auxiliary winding, and opening the second relay in response to at least one of the first current value and the second current value exceeding a current overload threshold.

Example embodiments described herein may provide one or more advantages, including but not limited to, reducing manufacturing costs of the compressor assembly, reducing switching complexity of the control circuit, increasing design control for motor optimization (such as optimizing for efficiency at a lighter load point while also meeting max load requirements), etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A compressor assembly comprising:
  a compressor motor coupled to operate a compressor of a heating, ventilation and/or air-conditioning (HVAC) system, the compressor motor including a stator core having a stator yoke and a plurality of teeth extending from the stator yoke toward a central opening, the central opening extending from a first end of the stator core to a second end of the stator core opposite the first end, the plurality of teeth spaced apart from one another and defining a plurality of slots between the plurality of teeth, the compressor motor further including a main winding and an auxiliary winding located within the plurality of slots and wrapped around the plurality of teeth, the main winding coupled with a line terminal to receive power from a line voltage source;
  a first capacitor coupled between the line terminal and the auxiliary winding to supply power to the auxiliary winding from the line voltage source;
  a second capacitor coupled between the line terminal and the auxiliary winding to supply power to the auxiliary winding from the line voltage source;
  a first relay coupled between the first capacitor and the second capacitor to selectively couple the first capacitor and the second capacitor in parallel;

a second relay coupled between the first capacitor and the auxiliary winding to selectively inhibit the supply of power from the line voltage source to the auxiliary winding via the first capacitor; and a control circuit coupled to control switching operation of the first relay and the second relay, the control circuit configured to close the first relay in response to detection of excess load condition criteria, and to subsequently open the first relay in response to detection of normal load condition criteria, the excess load condition criteria and the normal load condition criteria each including at least one of a voltage of the main winding and a voltage of the auxiliary winding.

2. The compressor assembly of claim 1, wherein the control circuit is configured to close the first relay during an initial startup time period of the compressor motor, and subsequently open the first relay in response to a detection of startup condition criteria, the startup condition criteria including at least one of an expiration of the initial startup time period, the voltage of the main winding and the voltage of the auxiliary winding.

3. The compressor assembly of claim 1, wherein the control circuit is configured to, in response to the detection of the excess load condition criteria:
open the second relay to disconnect the first capacitor from the line terminal or the auxiliary winding prior to the closing the first relay;
subsequent to opening the second relay, wait a specified voltage balance time period before the closing of the first relay; and
after the closing of the first relay, close the second relay to connect the first capacitor and the second capacitor to the line terminal or the auxiliary winding, to supply power from the line terminal to the auxiliary winding via the first capacitor and the second capacitor.

4. The compressor assembly of claim 3, further comprising a resistor coupled between the second relay and the second capacitor, wherein the second relay is coupled to connect the first capacitor with the second capacitor via the resistor when the second relay disconnects the first capacitor from the line terminal or the auxiliary winding.

5. The compressor assembly of claim 4, further comprising a diode including a cathode and an anode, wherein the cathode is coupled with the resistor and the anode is coupled with the auxiliary winding.

6. The compressor assembly of claim 1, further comprising a diode including a cathode and an anode, wherein the cathode is coupled with the first capacitor and the anode is coupled with the auxiliary winding.

7. The compressor assembly of claim 1, wherein the control circuit is configured to receive a first current value indicative of a current through the main winding, receive a second current value indicative of a current through the auxiliary winding, and open the second relay in response to at least one of the first current value and the second current value exceeding a current overload threshold.

8. The compressor assembly of claim 1, wherein a capacitance value of the first capacitor is equal to a capacitance value of the second capacitor.

9. The compressor assembly of claim 1, wherein the compressor motor comprises a permanent split capacitor (PSC) motor.

10. The compressor assembly of claim 1, further comprising:
a third capacitor coupled between the line terminal and the auxiliary winding to supply power to the auxiliary winding from the line voltage source; and a third relay coupled between the first capacitor, the second capacitor and the third capacitor, to selectively couple the third capacitor in parallel with the first capacitor and the second capacitor, wherein the control circuit is coupled to control switching operation of the third relay.

11. The compressor assembly of claim 1, wherein:
the first capacitor comprises a first capacitor film disposed in an integral multi-capacitor housing; and
the second capacitor comprises a second capacitor film disposed in the integral multi-capacitor housing.

12. The compressor assembly of claim 11, wherein the integral multi-capacitor housing includes a third capacitor film adapted to couple between the line voltage source and a fan motor for a condenser unit of the heating, ventilation and/or air-conditioning (HVAC) system.

13. The compressor assembly of claim 1, wherein the control circuit is configured to determine at least one of a rotational speed of the motor and a load of the motor according to a polynomial equation having specified coefficients, and wherein the voltage of the main winding and the voltage of the auxiliary winding comprise inputs to the polynomial equation.

14. The compressor assembly of claim 13, wherein:
the control circuit is configured to calculate a phase difference between the voltage of the main winding and the voltage of the auxiliary winding;
the phase difference comprises one or more inputs to the polynomial equation;
the polynomial equation has a form of rotational speed or load=$p_0+p_1x+p_2y+p_3z+p_4x^2+p_5xy+p_6xz+p_7y^2+p_8yz+p_9z^2+p_{10}x^3+p_{11}x^2y+p_{12}x^2z+p_{13}xy^2+p_{14}y^3+p_{15}y^2z+p_{16}xz^2+p_{17}yz^2+p_{18}z^3+p_{19}xyz$;
x is the voltage of the main winding;
y is the voltage of the auxiliary winding;
z is the phase difference; and
$p_0$-$p_{19}$ are the specified coefficients.

15. The compressor assembly of claim 1, further comprising a thyristor electrically coupled with the second relay.

16. A compressor apparatus comprising:
a compression unit; and
the compressor assembly of claim 1 coupled to drive the compression unit.

17. The compressor apparatus of claim 16, wherein the compression unit comprises a scroll compressor.

18. The compressor assembly of claim 1, wherein the control circuit is configured to calculate a phase difference between the voltage of the main winding and the voltage of the auxiliary winding by:
tracking a waveform of the voltage of the main winding to generate a main winding phase angle;
tracking another waveform of the voltage of the auxiliary winding to generate an auxiliary winding phase angle; and
determining the phase difference according to the main winding phase angle and the auxiliary winding phase angle.

19. The compressor assembly of claim 18, wherein the control circuit is configured to determine at least one of a rotational speed of the motor and a load of the motor according to the calculated phase difference, the voltage of the main winding and the voltage of the auxiliary winding.

20. The compressor assembly of claim 1, wherein the control circuit comprises a digital microprocessor.

21. The compressor assembly of claim 1, wherein the thyristor is a first thyristor, and the assembly further comprises a second thyristor electrically coupled with the second capacitor.

22. A compressor assembly comprising:
a compressor motor coupled to operate a compressor of a heating, ventilation and/or air-conditioning (HVAC) system, the compressor motor including a stator core having a stator yoke and a plurality of teeth extending from the stator yoke toward a central opening, the central opening extending from a first end of the stator core to a second end of the stator core opposite the first end, the plurality of teeth spaced apart from one another and defining a plurality of slots between the plurality of teeth, the compressor motor further including a main winding and an auxiliary winding located within the plurality of slots and wrapped around the plurality of teeth, the main winding coupled to a line terminal to receive power from a line voltage source;
a first capacitor coupled between the line terminal and the auxiliary winding to supply power to the auxiliary winding from the line voltage source;
a second capacitor coupled between the line terminal and the auxiliary winding to supply power to the auxiliary winding from the line voltage source;
a relay coupled between the first capacitor and the line terminal or the auxiliary winding to selectively inhibit the supply of power from the line voltage source to the auxiliary winding via the first capacitor; and
a control circuit coupled to control switching operation of the relay, the control circuit configured to receive at least one of a voltage of the main winding and a voltage of the auxiliary winding, close the relay during an initial startup time period of the compressor motor, subsequently open the relay in response to detection of startup condition criteria, and close the relay in response to detection of excess load condition criteria, the excess load condition criteria including at least one of the received voltages of the main winding and the auxiliary winding.

23. The compressor assembly of claim 22, wherein the control circuit is configured to, subsequent to closing the relay in response to the detection of the excess load condition criteria, open the relay in response to detection of normal load condition criteria, the normal load condition criteria including at least one of the received voltages of the main winding and the auxiliary winding.

24. The compressor assembly of claim 22, wherein the control circuit is configured to receive a first current value indicative of a current through the main winding, receive a second current value indicative of a current through the auxiliary winding, and open the relay in response to at least one of the first current value and the second current value exceeding a current overload threshold.

25. The compressor assembly of claim 22, wherein:
the first capacitor comprises a first capacitor film disposed in an integral multi-capacitor housing; and
the second capacitor comprises a second capacitor film disposed in the integral multi-capacitor housing.

26. A method of controlling a compressor motor assembly, the assembly including a compressor motor having a stator yoke and a plurality of teeth extending from the stator yoke toward a central opening, the central opening extending from a first end of the stator core to a second end of the stator core opposite the first end, the plurality of teeth spaced apart from one another and defining a plurality of slots between the plurality of teeth, the compressor motor further including a main winding and an auxiliary winding located within the plurality of slots and wrapped around the plurality of teeth, the main winding coupled to a line terminal to receive power from a line voltage source, the assembly further including a first capacitor coupled between a line terminal and the auxiliary winding, a second capacitor coupled between the line terminal and the auxiliary winding, a first relay coupled between the first capacitor and the second capacitor, and a second relay coupled between the first capacitor and the auxiliary winding, the method comprising:
opening the first relay and closing the second relay during a run time period of the compressor motor;
receiving a voltage of at least one of the main winding and the auxiliary winding; and
in response to detection of excess load condition criteria including at least the received voltage:
opening the second relay to disconnect the first capacitor from the line terminal or the auxiliary winding;
after a specified voltage balance time period, closing the first relay to couple the first capacitor and the second capacitor in parallel; and
closing the second relay to connect the first capacitor and the second capacitor to the line terminal or the auxiliary winding, to supply power from the line terminal to the auxiliary winding via the first capacitor and the second capacitor.

27. The method of claim 26, further comprising:
closing the first relay during an initial startup time period of the compressor motor; and
in response to detection of startup condition criteria including at least one of the received voltage and an expiration of the initial startup time period, opening the first relay.

28. The method of claim 26, further comprising:
receiving a first current value indicative of a current through the main winding;
receiving a second current value indicative of a current through the auxiliary winding; and
opening the second relay in response to at least one of the first current value and the second current value exceeding a current overload threshold.

* * * * *